(12) United States Patent
Katayama et al.

(10) Patent No.: US 7,887,449 B2
(45) Date of Patent: *Feb. 15, 2011

(54) SPEED-CHANGE TRANSMISSION APPARATUS

(75) Inventors: Yoshiyuki Katayama, Osaka (JP); Yoshihiro Ueda, Sakai (JP); Shoso Ishimori, Sakai (JP); Minoru Hiraoka, Osakasayama (JP)

(73) Assignee: Kubota Corporation, Osaka (JP)

( * ) Notice: Subject to any disclaimer, the term of this patent is extended or adjusted under 35 U.S.C. 154(b) by 260 days.

This patent is subject to a terminal disclaimer.

(21) Appl. No.: 11/661,846

(22) PCT Filed: Sep. 25, 2006

(86) PCT No.: PCT/JP2006/318939

§ 371 (c)(1),
(2), (4) Date: Apr. 2, 2008

(87) PCT Pub. No.: WO2007/040076

PCT Pub. Date: Apr. 12, 2007

(65) Prior Publication Data
US 2008/0214351 A1    Sep. 4, 2008

(30) Foreign Application Priority Data
Sep. 30, 2005    (JP)    ............... 2005-286072

(51) Int. Cl.
*F16H 47/04*    (2006.01)
(52) U.S. Cl. ....................................................... 475/82
(58) Field of Classification Search ........................ None
See application file for complete search history.

(56) References Cited

U.S. PATENT DOCUMENTS

| 4,382,392 | A | * | 5/1983 | Meyerle et al. | ................ | 475/81 |
| 5,156,577 | A | * | 10/1992 | Fredriksen et al. | ............ | 475/74 |
| 5,328,418 | A | * | 7/1994 | Meyerle | ....................... | 475/81 |
| 5,643,122 | A | | 7/1997 | Fredriksen | | |
| 5,766,107 | A | * | 6/1998 | Englisch | ........................ | 475/80 |
| 5,911,645 | A | | 6/1999 | Wontner et al. | | |
| 6,042,496 | A | | 3/2000 | Lehle et al. | | |
| 7,063,638 | B2 | * | 6/2006 | Weeramantry | ................ | 475/74 |
| 2009/0156345 | A1 | * | 6/2009 | Ishimori et al. | ............. | 475/116 |

FOREIGN PATENT DOCUMENTS

| JP | 8240255 | 9/1996 |
| JP | 2002139126 | 5/2002 |
| JP | 2003130176 | 5/2003 |

* cited by examiner

*Primary Examiner*—Dirk Wright
(74) *Attorney, Agent, or Firm*—The Webb Law Firm

(57) ABSTRACT

A speed-change transmission apparatus for effecting a speed-changing on an engine drive force with utilizing a continuously variable speed-change device, a plurality of planetary transmission mechanisms and a plurality of clutches is constructed to be capable of effecting the speed-changing operation smoothly, regardless of a centrifugal force generated in the clutches. An output from the continuously variable speed-change device and a drive force from the engine are combined by a planetary transmission section. The drive force from this planetary transmission section is transmitted via a clutch section to an output shaft. First, second, third and fourth clutches of the clutch section are configured to be switched over respectively between an engaged condition and a disengaged condition, as clutch members are engaged with or disengaged from output side rotational members.

7 Claims, 13 Drawing Sheets

Fig.7

| | | first clutch 73 | second clutch 74 | third clutch 76 | fourth clutch 78 | brake 90 | reverse clutch 84 | forward clutch 81 |
|---|---|---|---|---|---|---|---|---|
| forward traveling | first speed range | engaged | — | — | — | engaged | — | engaged |
| | second speed range | — | engaged | — | — | engaged | — | engaged |
| | third speed range | — | engaged | engaged | — | — | — | engaged |
| | fourth speed range | — | engaged | — | engaged | — | — | engaged |
| reverse traveling | first speed range | engaged | — | — | — | engaged | engaged | — |
| | second speed range | — | engaged | — | — | engaged | engaged | — |
| | third speed range | — | engaged | engaged | — | — | engaged | — |
| | fourth speed range | — | engaged | — | engaged | — | engaged | — |

Fig.8
(a)
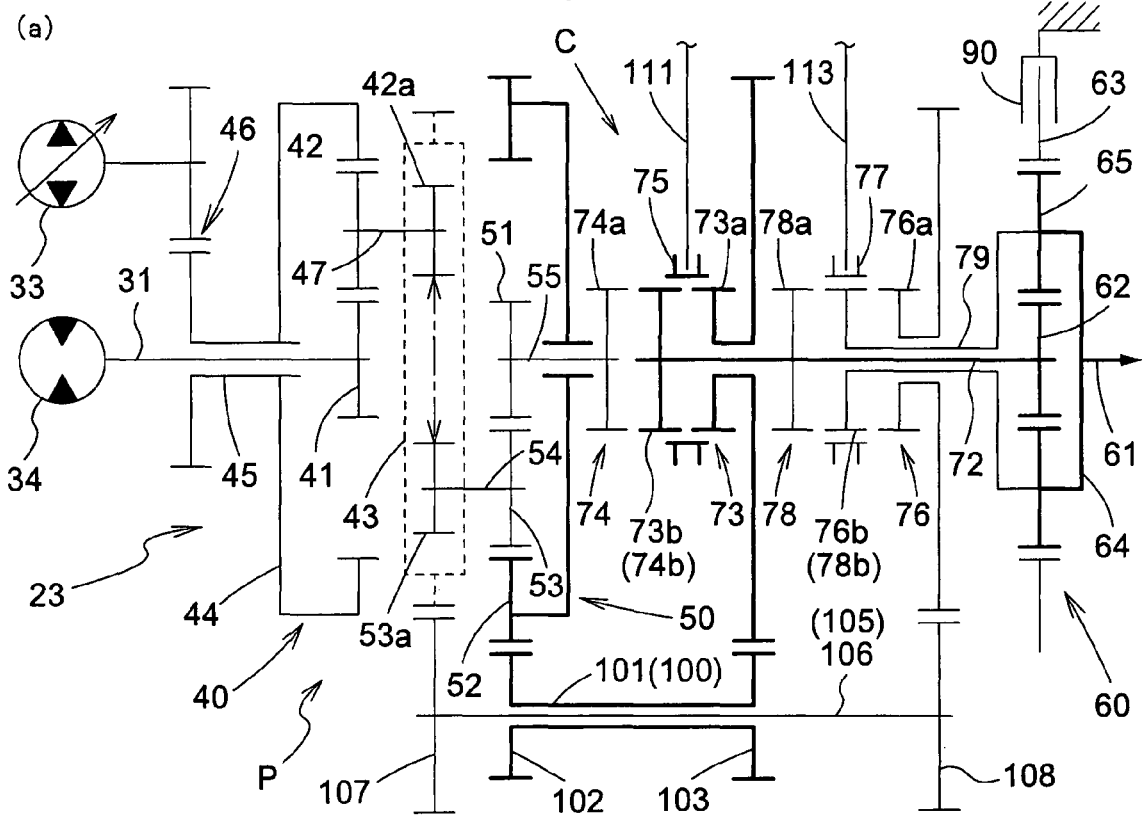
(b)
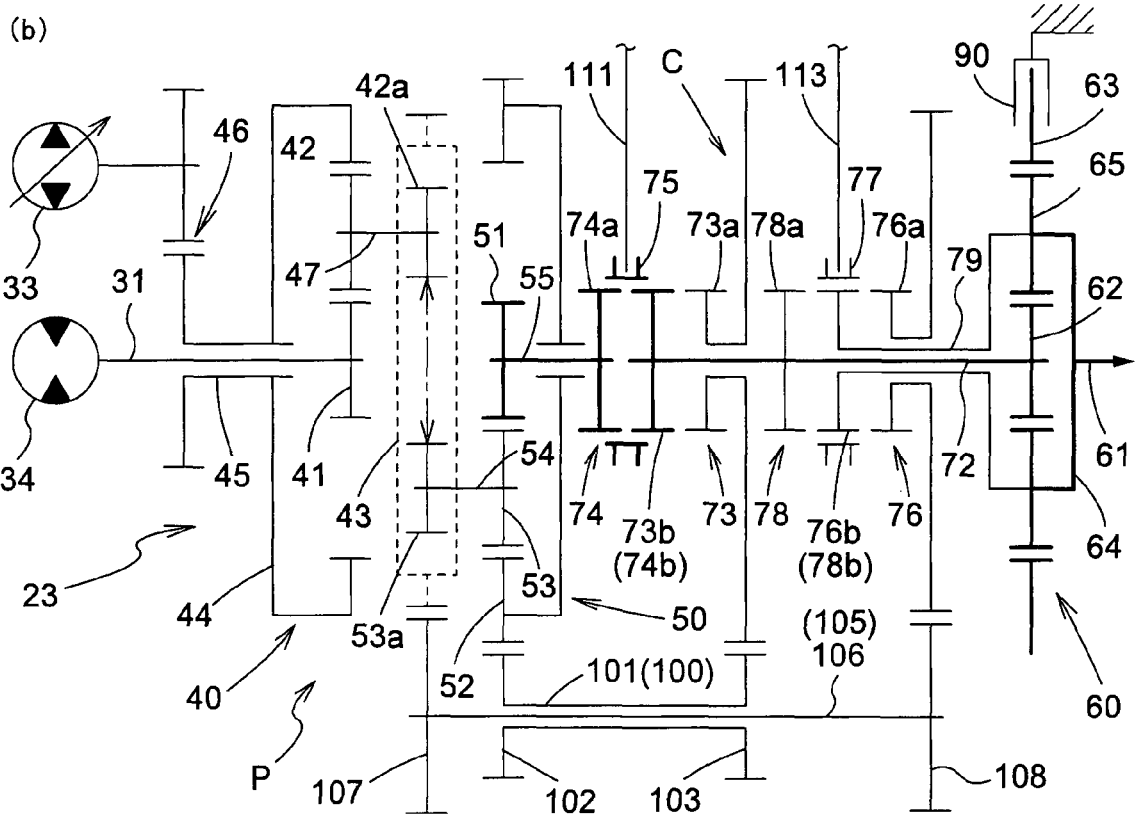

Fig.9
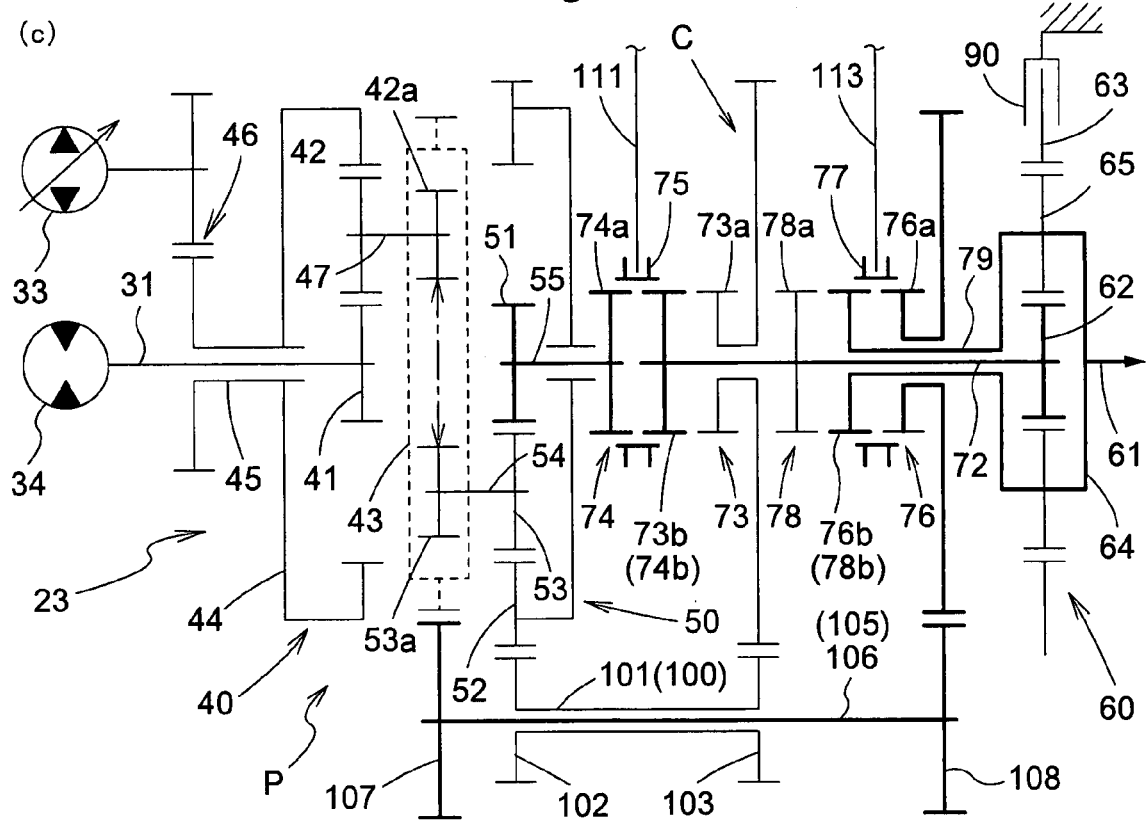
(c)
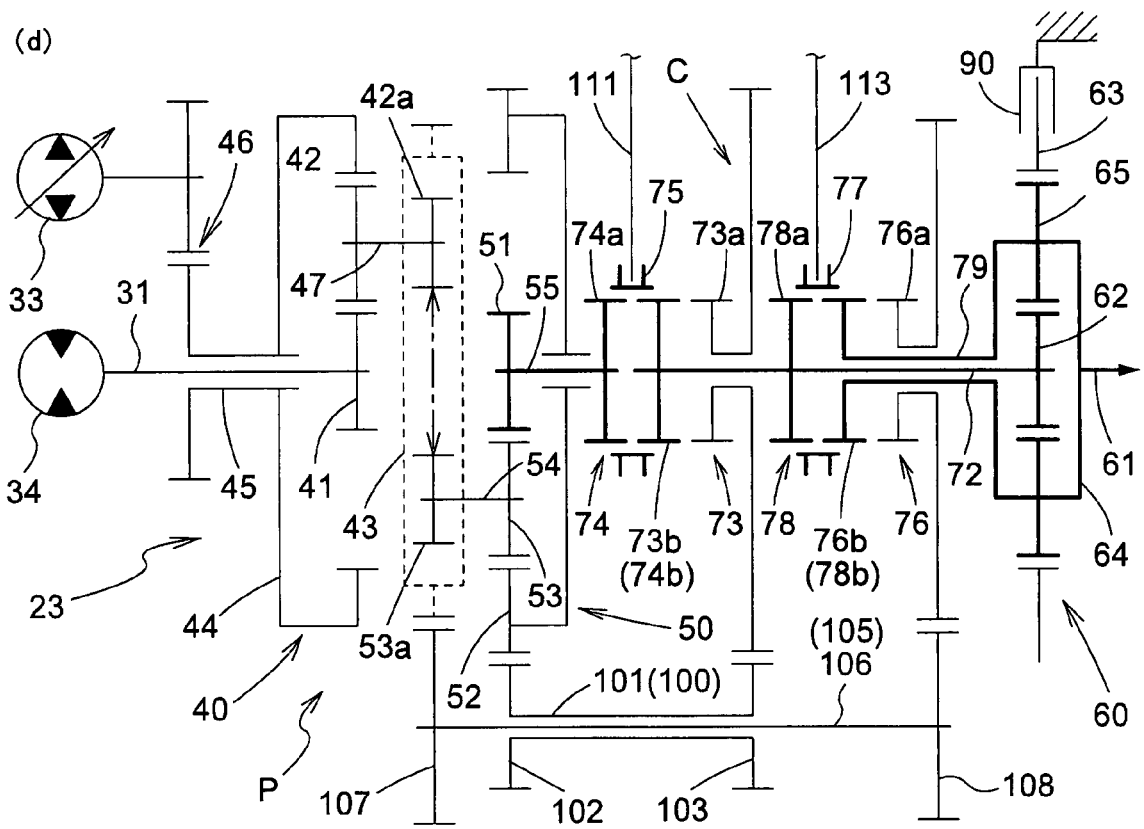
(d)

Fig.15

|  |  | main speed-changing section | | auxiliary speed-changing device | |
|---|---|---|---|---|---|
|  |  | first clutch 73 | second clutch 74 | low-speed clutch CL | high-speed clutch CH |
| low-speed mode | first speed range | engaged | — | engaged | — |
|  | second speed range | — | engaged | engaged | — |
| high-speed mode | first speed range | engaged | — | — | engaged |
|  | second speed range | — | engaged | — | engaged |
| multiple speed mode | first speed range | engaged | — | engaged | — |
|  | second speed range | — | engaged | engaged | — |
|  | third speed range | engaged | — | — | engaged |
|  | fourth speed range | — | engaged | — | engaged |

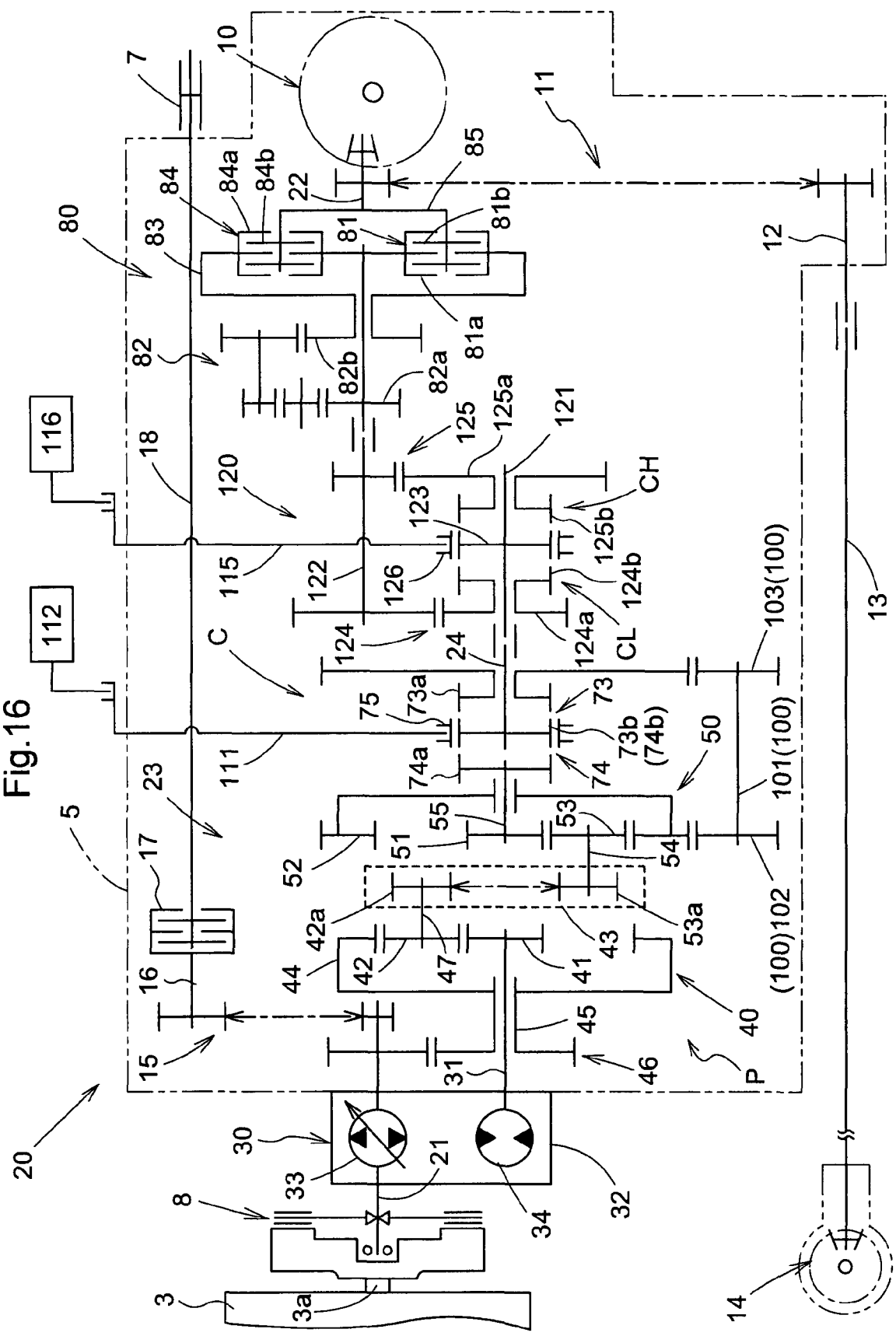

SPEED-CHANGE TRANSMISSION APPARATUS

BACKGROUND OF THE INVENTION

1. Field of the Invention

This invention relates to a speed-change transmission apparatus, more particularly to a speed-change transmission apparatus having a continuously variable speed-change device and a planetary transmission section.

2. Description of Related Art

Examples of such conventional speed-change transmission apparatus are disclosed in e.g. Patent Document 1 and Patent Document 2.

The speed-change transmission apparatus disclosed in Patent Document 1 includes a unit having a variable displacement hydrostatic unit 4 and a fixed displacement hydrostatic unit 6, a planetary transmission section having a first planetary gear set 9, a second planetary gear set 10 and a planetary gear set 22 and a clutch section having a coupling 27, a coupling 32, a coupling 35 and a coupling 39.

The speed-change transmission apparatus disclosed in Patent Document 2 includes a hydraulic unit 4, a summator gear 10, a clutch section having clutches K1, K2, a planetary transmission section having a first planetary gear step 12 and a second planetary gear step 13, and another clutch section having clutches K3, K4.

Patent Document 1: U.S. Pat. No. 6,042,496
Patent Document 2: U.S. Pat. No. 5,911,645

SUMMARY OF THE INVENTION

With this type of speed-change transmission apparatus, if a hydraulic clutch which is switched over between an engaged condition and a disengaged condition by a hydraulic piston incorporated within the clutch is employed as the clutch to be provided in the clutch section, it sometimes happens that the clutch cannot be switched over smoothly, due to an influence from a centrifugal force generated in the clutch to the work oil. Especially, if the diameter of the clutch is increased in the case of e.g. a clutch arrangement where one of a pair of clutches is disposed on the outer peripheral side of the other clutch or an arrangement designed to provide a greater torque to be transmitted, the influence from the centrifugal force is significant.

An object of the present invention is to provide a speed-change transmission apparatus capable of realizing s smooth speed-changing operation as the switchover operation of the clutch is caused to take place under a condition hardly affected by the influence of the centrifugal force.

According to a first invention, there is provided a speed-change transmission apparatus comprising: a continuously variable speed-change device receiving a drive force of an engine; a planetary transmission section having a plurality of planetary transmission mechanisms for combining an output from the continuously variable speed-change device and a drive force from the engine which is not subjected to a speed-changing action by the continuously variable speed-change device; a clutch section having a plurality of clutches and outputting a drive force from said planetary transmission section to an output shaft; said output shaft outputting an output having a rotational speed corresponding to a speed-change position of the continuously variable speed-change device and an operational condition of each clutch, as said each clutch is switched over between the engaged condition and the disengaged condition;

wherein said each clutch of said clutch section comprises a meshing clutch including an input side rotational member for receiving the drive force from said planetary transmission section, an output side rotational member for outputting a drive force to said output shaft, and a clutch member; and said clutch member is switchable between an engaged condition where said clutch member is engaged with said input side rotational member and said output side rotational member so as to operatively couple said input side rotational member and said output side rotational member of a corresponding clutch and a disengaged condition where said clutch member is disengaged from said input side rotational member or said output side rotational member so as to allow relative rotation between said input side rotational member and said output side rotational member.

That is, each clutch is constructed as a meshing clutch wherein the clutch member is engaged with the input side rotational member and the output side rotational member of a corresponding clutch so as to operatively couple these input side and output side rotational members together and the clutch member is disengaged from the input side rotational member or the output side rotational member so as to allow relative rotation between these input side and output side rotational members. With this, if the clutch is switched over hydraulically by operatively coupling the clutch member with a hydraulic actuator via e.g. a shift fork, it becomes possible to switch over each clutch, without influence from the centrifugal force generated in the clutch to the work oil and without need of providing within a transmission shaft an oil passageway for operating each clutch. Further, even when each clutch effects power transmission under high speed rotation, each clutch can be switched over smoothly.

Therefore, with the first invention, it is possible to switch over the clutch without being influenced by the centrifugal force and to provide a wide speed-changing range for enabling high speed output. And, it is also possible to provide a smooth speed changing operation as the clutch is switched over without delay in timing, thus causing no speed-changing shock. In particular, even in the case of a hauling work generating high load, traveling can be effected with good riding feel and in a comfortable manner, with no or little speed-changing shock.

Moreover, as there is no need to provide an operational oil passageway or sealing arrangement within the transmission shaft, the construction can be compact and economical.

According a second invention, in the first invention construction described above, said clutch section includes two clutches.

Namely, with a speed-changing operation of the continuously variable speed-change device and appropriate switchover operations of the two clutches, the engine drive force is provided in two speed ranges and in each speed range, the force is steplessly speed-changed and outputted.

Therefore, according to the second invention, with the speed-changing operation of the continuously variable speed-change device and switchover operations of the clutches, it is possible to obtain an output which is provided in two stages and steplessly speed-changed in each stage. Hence, with additional use of an auxiliary speed-changing device, there may be achieved convenience use with extended or increased speed-changing range or speed range adjustment.

According to a third invention, in the first invention construction described above, said clutch section includes four clutches.

Namely, with a speed-changing operation of the continuously variable speed-change device and appropriate switchover operations of the four clutches, the engine drive force is provided in four speed ranges and in each speed range, the force is steplessly speed-changed and outputted.

Therefore, according to the third invention, with the speed-changing operation of the continuously variable speed-change device and switchover operations of the clutches, it is possible to obtain an output which is provided in four stages and steplessly speed-changed in each stage, so that it is possible to obtain an output suitable not only for a work, but also for traveling.

According to a fourth invention, in any one of the first through third inventions described above, the apparatus further comprises: a planetary side transmission gear operatively meshed with a rotational member of said planetary transmission section and rotatable about a rotational axis different from a rotational axis of said rotational member; a clutch side transmission gear operatively meshed with said input side rotational member of said clutch and rotatable about a rotational axis different from a rotational axis of said input side rotational member; and a rotation coupling shaft for coupling said planetary side transmission gear and said clutch side transmission gear with each other.

That is, the transmission line including the plurality of clutches juxtaposed each other and the rotation coupling shaft for operatively coupling the rotational member of the planetary transmission section to the input side rotational member of the clutch are arranged side by side parallel with each other and the operational line can be arranged to extend from a lateral side of the clutch member to the clutch member, so as to avoid interference between the operational line for coupling the clutch with the clutch member for switchover and the rotation coupling shaft.

Therefore, according to the fourth invention, the operational line for switching over the clutch can be provided as a simple construction arranged to couple from the lateral side of the clutch member to the clutch member. Hence, in this respect too, the speed-change transmission apparatus can be obtained economically.

According to a fifth invention, in the third invention construction described above, the apparatus further comprises: a pair of planetary side transmission gears operatively meshed respectively with two rotational members of said planetary transmission section and rotatable about rotational axes different from rotational axes of said two rotational members; a pair of clutch side transmission gears operatively meshed respectively with input side rotational members of two clutches of said clutch section and rotatable about rotational axes of said two input side rotational members; and a pair of rotation coupling shafts for operatively coupling said pair of planetary side transmission gears with said pair of clutch side transmission gears, respectively; one of said pair of rotation coupling shafts being constructed as a hollow shaft and rotatably fitted on the other coupling shaft.

That is, the transmission line including the plurality of clutches juxtaposed, the rotation coupling shaft for coupling one rotational member of the planetary transmission section with one input side rotational member of the clutch, and the rotation coupling shaft for coupling the other rotational member of the planetary transmission section with the other input side rotational member of the clutch can be arranged side by side parallel with each other and the operational line can be arranged to extend from a lateral side of the clutch member to the clutch member, so as to avoid interference between the operational line for coupling the clutch with the clutch member for switchover and the rotation coupling shafts of the two operational coupling lines.

With the above, the pair of rotation coupling shafts are provided as a double shaft construction having one of the pair of rotation coupling shafts being fitted on the other, so that this construction can be accommodated within a minimal space and at the same time, the two rotational members of the planetary transmission section can be coupled respectively with the two input side rotational members of the clutch section.

Therefore, according to the fifth invention, the operational line for switching over the clutch can be provided as a simple construction arranged to couple from the lateral side of the clutch member to the clutch member. In addition, the pair of rotation coupling shafts can be accommodated within a minimal space. Hence, the speed-change transmission apparatus can be provided compactly and economically.

According to a sixth invention, in any one of the first through third inventions described above, said planetary transmission section includes a first planetary transmission mechanism having a sun gear receiving the output from said continuously variable speed-change device and a ring gear receiving the drive force of the engine not affected by the speed-changing function of said continuously variable speed-change device, a second planetary transmission mechanism having a planetary gear operatively coupled with a planetary of said first planetary transmission mechanism, and a common carrier for supporting the planetary gear of said first planetary transmission mechanism and the planetary gear of said second planetary transmission mechanism such that the planetary gear of said first planetary transmission mechanism and the planetary gear of said second planetary transmission mechanism are revolved in unison.

That is, the planetary transmission section includes two pairs of planetary transmission mechanisms. Yet, the sun gear, the ring gear and the common carrier of the second planetary transmission mechanism are operatively coupled with the clutch section, so that with appropriate switchover operations of the respective clutches of the clutch section between the engaged condition and the disengaged condition, the engine drive force can be provided in a plurality of speed ranges and can be steplessly speed-changed in each speed range.

With the above, as the engine drive force can be provided in a plurality of speed ranges and can be steplessly speed-changed in each speed range, even when the driving load varies over a wide range, it is possible to obtain a drive force suitable for each driving load for realizing advantageous driving condition. Yet, the construction can be obtained economically as the simple construction having only two pair of planetary transmission mechanisms in the planetary transmission section.

BRIEF DESCRIPTION OF THE DRAWINGS

FIG. 7 is an explanatory view showing relationship between operational conditions of respective clutches and a brake and speed ranges, FIG. 8(A) is a diagram showing a transmission line under a first speed range of the main speed-changing section, FIG. 8(B) is a diagram showing a transmission line under a second speed range of the main speed-changing section, FIG. 9(C) is a diagram showing a transmission line under a third speed range of the main speed-changing section, FIG. 9(D) is a diagram showing a transmission line under a fourth speed range of the main speed-changing section, FIG. 15 is an explanatory view showing relationship among speed-changing modes, operational conditions of respective clutches and speed ranges in a traveling transmission apparatus having a further embodiment, and FIG. 16 is a diagram of a traveling transmission apparatus having a further embodiment.

DETAILED DESCRIPTION OF THE PRESENT INVENTION

Next, embodiments of the present invention will be described with reference to the accompanying drawings.

Figure 1:
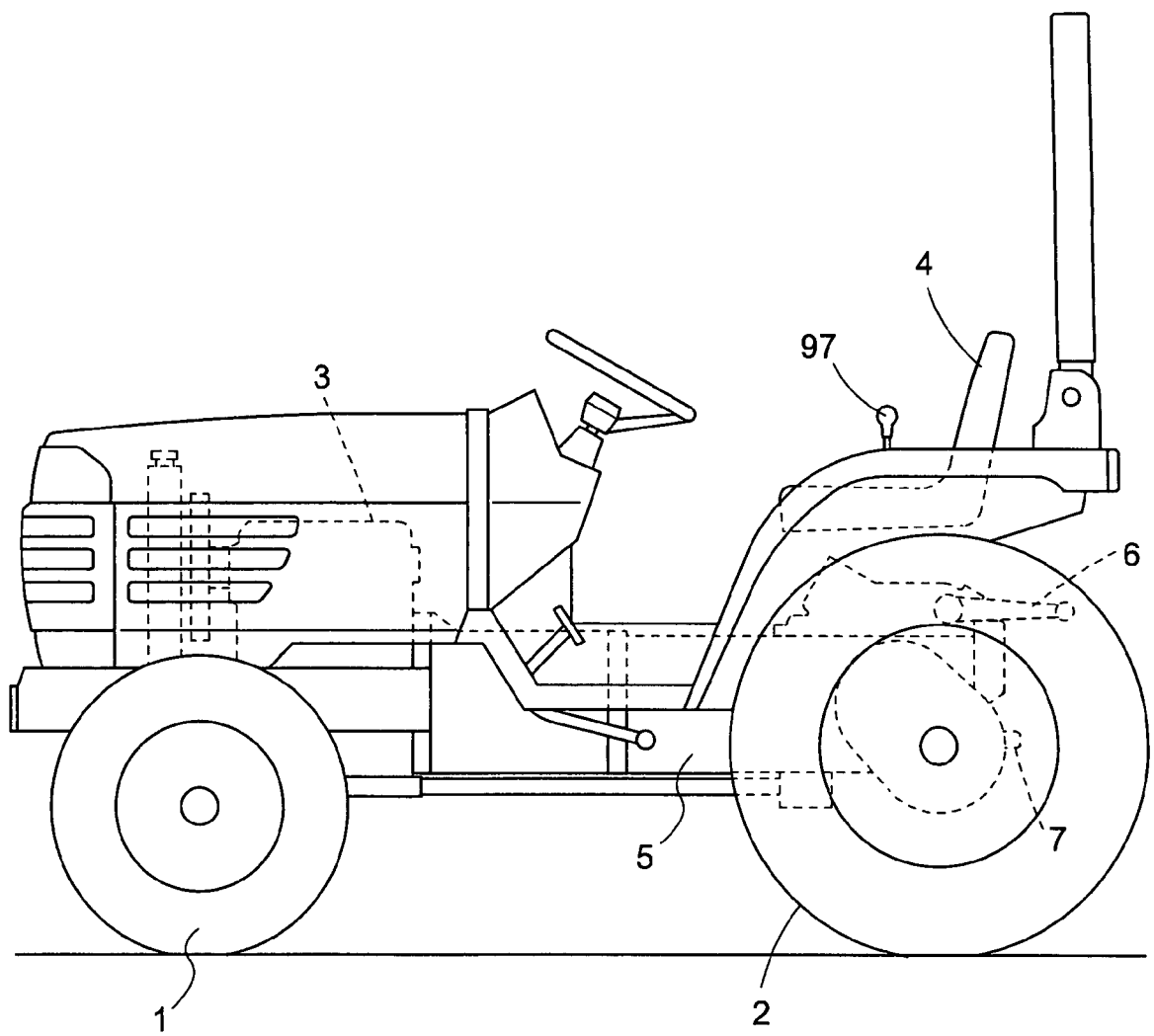
FIG. 1 is a side view showing an entire tractor.

As shown in FIG. 1, a tractor, as an example of a utility vehicle, includes a vehicle frame mounting a pair of right and left steerable and drivable front wheels 1, a pair of right and left drivable rear wheels 2, an engine section having an engine 3 mounted at a front portion of the vehicle body, and a driving section having a driver's seat 4 at a rear portion of the vehicle body. A rear transmission case 5 constitutes a rear portion of the vehicle frame. Rearwardly of and opposed lateral sides of this rear transmission case 5, there are mounted lift arms 6 vertically pivotable. To a rear wall portion of the rear transmission case 5, there is attached a power takeoff (PTO) shaft 7.

This tractor allows attachment, to its rear vehicle body portion, of a rotary plow implement (not shown) liftable up/down via a link mechanism (not shown) utilizing the pair of right and left lift arms 6. And, the drive force from the engine 3 can be transmitted via the PTO shaft 7 to this rotary plow implement. Therefore, this tractor can be used as a riding type plowing machine. The tractor can be used as various types of utility machines by attaching various implements to the rear vehicle body portion to be liftable and drivable.

Figure 2:
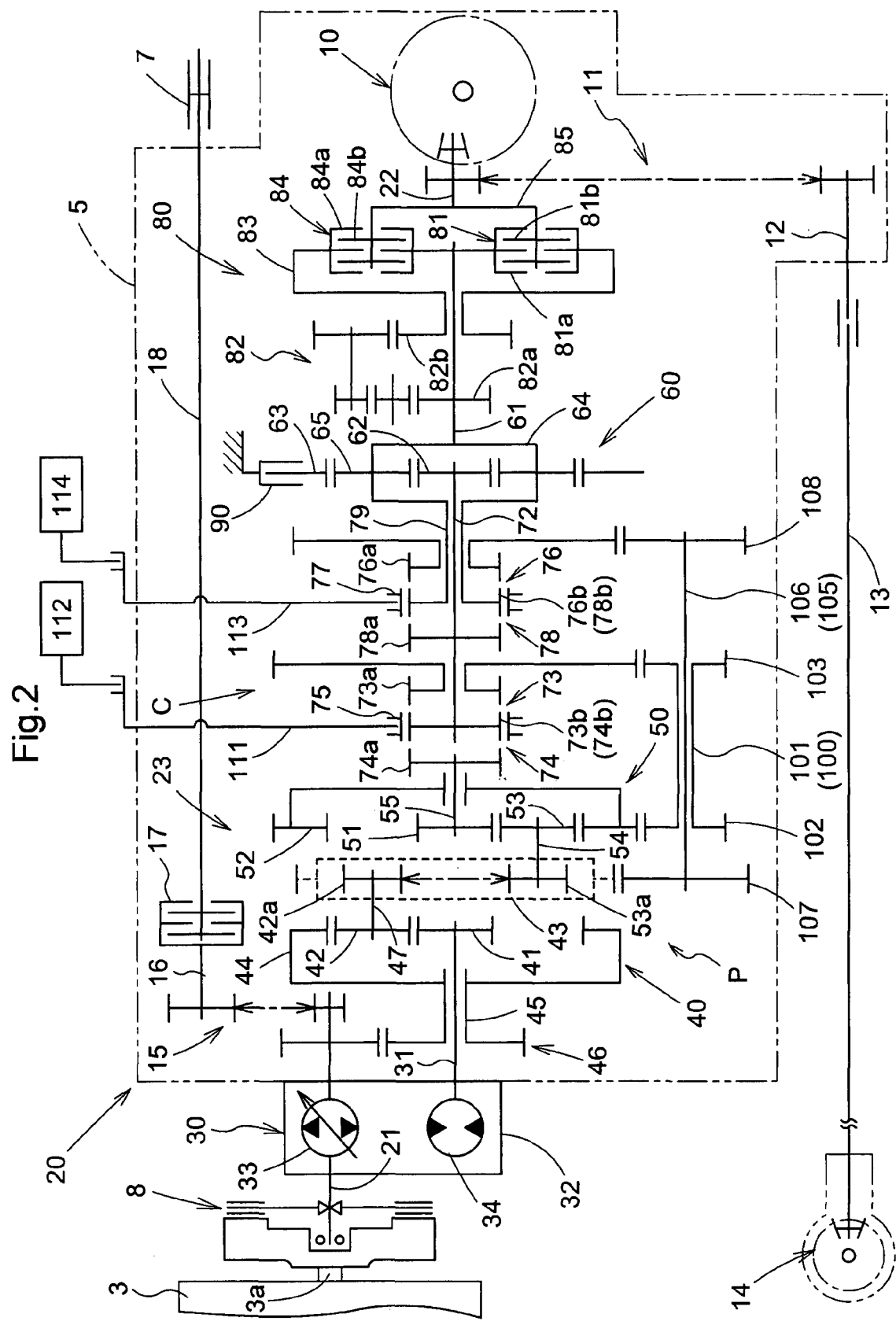
FIG. 2 is a diagram of a transmission apparatus.

As shown in FIG. 2, a drive force from an output shaft 3a of the engine 3 is transmitted via a main clutch 8 to an input shaft 21 of a speed-change transmission apparatus 20. An output from an output shaft 22 of this speed-change transmission apparatus 20 is transmitted to a rear wheel differential mechanism 10. And, the drive force is transmitted in distribution through this rear wheel differential mechanism 10 to the right and left rear wheels 2. The output from the output shaft 22 of the speed-change transmission apparatus 20 is transmitted via a front wheel output shaft 12 operatively coupled via a gear mechanism 11 to the output shaft 22 and a rotation transmission shaft 13 to a front wheel differential mechanism 14. Via this front wheel differential mechanism 14, the drive force is transmitted in distribution to the right and left front wheels 1. The drive force transmitted from the engine 3 to the input shaft 21 of the speed-change transmission apparatus 20 is transmitted via an implement output shaft 16 operatively coupled with the input shaft 21 via a gear mechanism 15, an implement clutch 17 having its input side operatively coupled with this implement output shaft 16 and a rotation transmission shaft 18 operatively coupled with the output side of this implement clutch 17, to the PTO shaft 7.

As shown in FIG. 2, the speed-change transmission apparatus 20 includes a main speed-changing section 23 having a stepless or continuously variable speed-change device 30, etc. The input shaft 21 functions as an input shaft for the continuously variable or stepless speed-change device 30. The speed-change transmission apparatus 20 further includes a forward/reverse switchover mechanism 80 having e.g. a forward clutch 81 mounted on a carrier shaft 61 functioning as an output shaft for the main speed-changing section 23.

The main speed-changing section 23 includes a planetary transmission section P having e.g. a first planetary transmission mechanism 40 having a sun gear 41 connected to an output shaft 31 of the continuously variable speed-change device 30 to be rotatable therewith, a clutch section C having e.g. a first clutch 73 operatively coupled via an operable coupling mechanism 100 with a ring gear 52 of a second planetary transmission mechanism 50 included in this planetary transmission section P, a third planetary transmission mechanism 60 having a sun gear 62 coupled via a sun rotation transmission shaft 72 with a first clutch 73 included in this clutch section C, and a brake 90 provided on the outer peripheral side of a ring gear 63 of this third planetary transmission mechanism 60.

The continuously variable speed-change device 30 is connected to a front portion of the rear transmission case 5. The planetary transmission section P, the clutch section C, the third planetary transmission mechanism 60, the brake 90 and the forward/reverse switchover mechanism 80 are accommodated within the rear transmission case 5.

The continuously variable speed-change device 30 includes a speed-changing case 32 connected to a front portion of the rear transmission case 5, a hydraulic pump 33 provided inside this speed-changing case 32 and a hydraulic motor 34. The hydraulic pump 32 is a variable displacement hydraulic pump of the axial plunger type, having a pump shaft which functions also as the input shaft 21 of the speed-change transmission apparatus 20. The hydraulic motor 34 is an axial plunger type hydraulic pump connected to the hydraulic pump 33 to be driven by pressure oil from this hydraulic pump 33 and having a motor shaft which functions also as the output shaft 31 of the continuously variable speed-change device 30.

That is to say, the continuously variable speed-change device 30 is a hydrostatic type continuously variable speed-change device in which the drive force from the engine 3 is inputted to the input shaft 21. In response to a changing operation of a swash plate angle of the hydraulic pump 33, there can be selectively provided a forward rotation transmission condition in which the drive force from the engine 3 is converted into a drive force in a forward rotation direction and speed-changed steplessly to be outputted from the output shaft 31, a reverse rotation transmission condition in which the drive force from the engine 3 is converted into a drive force in a reverse rotation direction and speed-changed steplessly to be outputted from the output shaft 31, or a neutral condition in which the driving of the hydraulic motor 34 is stopped, thus stopping output from the output shaft 31.

As shown in FIG. 2, the planetary transmission section P includes the first planetary transmission mechanism 40 and the second planetary transmission mechanism 50.

Figure 10:
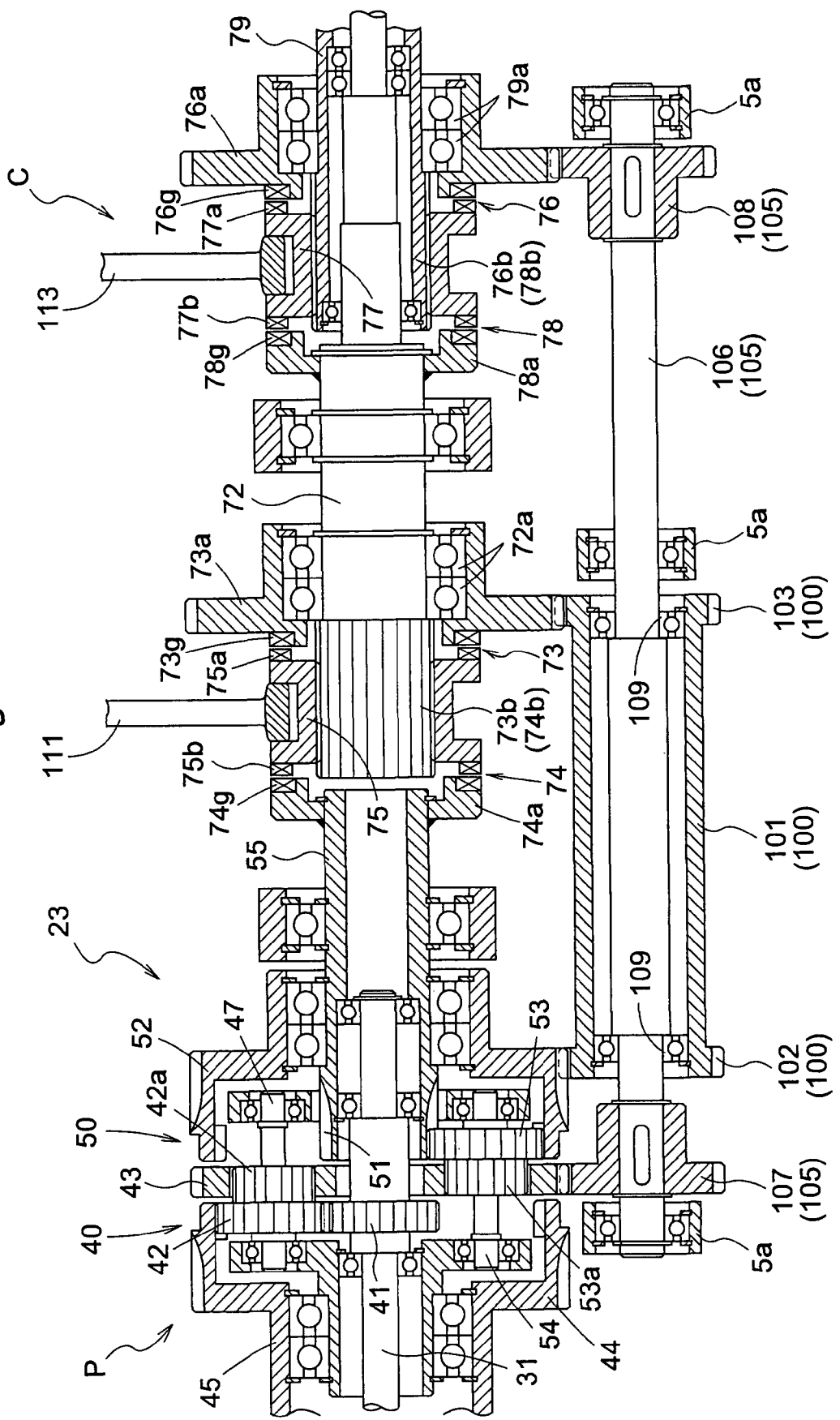
FIG. 10 is a section view of a planetary transmission section, an operative coupling mechanism and a clutch section.

As shown in FIG. 2 and FIG. 10, the first planetary transmission mechanism 40 includes the sun gear 41 supported to the output shaft 31 of the continuously variable speed-change device 30, a plurality of planetary gears 42 meshing with the sun gar 41 at a plurality of positions along the outer periphery of the sun gear 41, a carrier 43 supported such that the plurality of planetary gears 42 may rotate about their own axes and also revolve about the sun gear 41, and a ring gear 44 having an inner peripheral gear portion meshing with the plurality of planetary gears 42.

The sun gear 41 of the first planetary transmission mechanism 40 is connected to the output shaft 31 of the continuously variable speed-change device 30 to be rotatable in unison therewith, so as to receive the output from this output shaft 31 of the continuously variable speed-change device 30.

At the center of the ring gear 44, there is mounted, rotatable in unison therewith, a coupling hollow shaft 45 fitted on the output shaft 31 to be rotatable relative thereto. This coupling hollow shaft 45 is operatively coupled, via a gear coupling mechanism 46, with an end of the input shaft 21 of the continuously variable speed-change device 30. So that, the drive force of the engine 3 may be transmitted to the ring gear 44 of the first planetary transmission mechanism 40, without being subjected to the speed-changing action of the continuously variable speed-change device 30.

As shown in FIG. 2 and FIG. 10, the second planetary transmission mechanism 50 includes the sun gear 51 arranged to be rotatable about a same axis as the sun gear 41 of the first planetary transmission mechanism 40, a plurality of planetary gears 53 meshing with the sun gar 51 at a plurality of positions along the outer periphery of the sun gear 51, a carrier 43 supported such that the plurality of planetary gears 53 may rotate about their own axes and also revolve about the sun gear 51, and the ring gear 52 having an inner peripheral gear portion meshing with the plurality of planetary gears 53.

Figure 3:
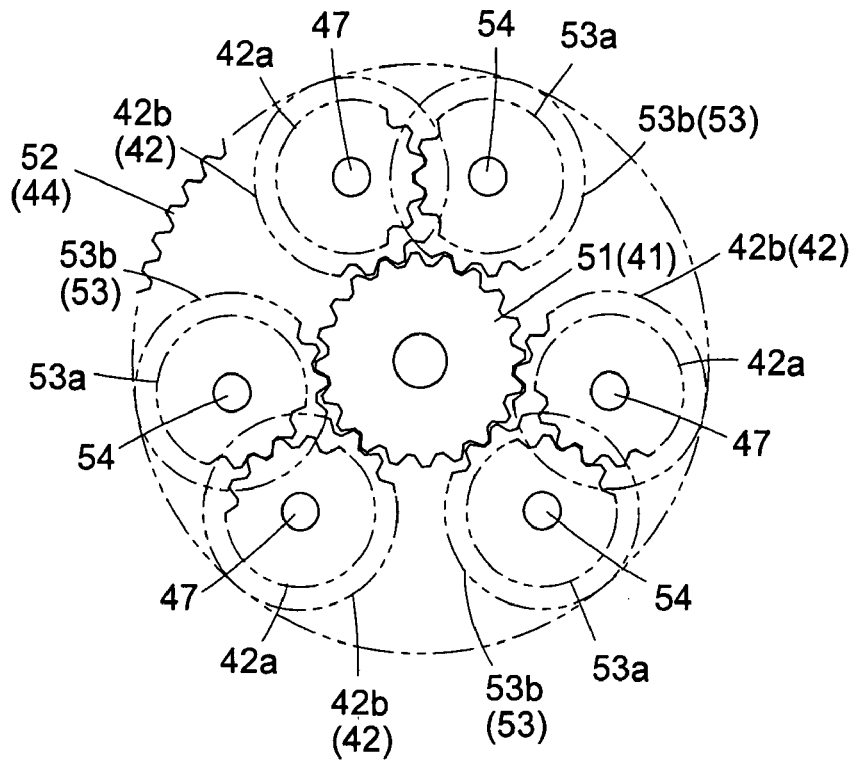
FIG. 3 is a front view showing operative coupling condition among planetary gears of a first planetary transmission mechanism and a second planetary transmission mechanism.
Figure 4:
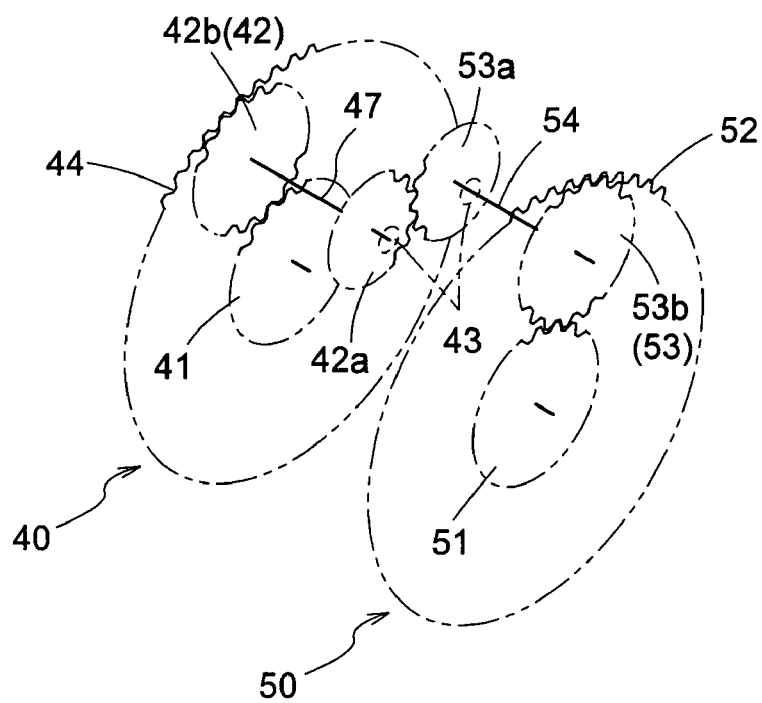
FIG. 4 is a schematic view showing the operative coupling condition among the planetary gears of the first planetary transmission mechanism and the second planetary transmission mechanism.

As shown in FIG. 3, FIG. 4 and FIG. 10, by coupling a gear, via a coupling shaft 47, to the vehicle body rear side of each planetary gear 42 of the first planetary transmission mechanism 40, there is provided a coupling gear portion 42a having an outer diameter slightly smaller than the outer diameter of the planetary gear 42 to be rotatable in unison with this planetary gear 42. That is, each planetary gear 42 of the first planetary transmission mechanism 40 includes a gear portion 42b functioning as a planetary gear body meshing with the ring gear 44 and the coupling gear portion 42a offset, relative to this gear portion 42b, toward the second planetary transmission mechanism 50 and rotatable in unison with the gear portion 42b.

By coupling a gear, via a coupling shaft 54, to the vehicle body front side of each planetary gear 53 of the second planetary transmission mechanism 50, there is provided a coupling gear portion 53a having an outer diameter slightly smaller than the outer diameter of the planetary gear 53 to be rotatable in unison with this planetary gear 53. That is, each planetary gear 53 of the second planetary transmission mechanism 50 includes a gear portion 53b functioning as a planetary gear body meshing with the ring gear 52 and the coupling gear portion 53a offset, relative to this gear portion 53b, toward the first planetary transmission mechanism 40 and rotatable in unison with the gear portion 53b.

As the planetary gears 42, 53 of the first planetary transmission mechanism 40 and the second planetary transmission mechanism 50, this can be modified such that the gear portion 42b, 53b functioning as the planetary gear body and the coupling gear portion 42a, 53a are directly coupled with each other without the coupling shaft 47, 54 therebetween or such that the gear portion 42b, 53b and the coupling gear portion 42a, 53a have a same number of teeth.

The carrier 43 of the first planetary transmission mechanism 40 and the carrier 43 of the second planetary transmission mechanism 50 is provided as an integral carrier. Namely, this is provided as a common carrier providing the supporting function to both the planetary gear 42 of the first planetary transmission mechanism 40 and the planetary gear 53 of the second planetary transmission mechanism 50.

That is to say, the planetary gears 42 of the first planetary transmission mechanism 40 and the planetary gears 53 of the second planetary transmission mechanism 50 corresponding to each other at the plurality of positions along the peripheries of the sun gears 41, 51 of the first planetary transmission mechanism 40 and the second planetary transmission mechanism 50 are supported by the common carrier 43, with the coupling gear portions 42a, 53a of these planetary gears 43, 53 being meshed with each other. Therefore, these planetary gears 42 and 53 are rotated about their own respective axes, with the rotation direction of the planetary gear 42 and the rotation direction of the planetary gear 53 being opposite rotation directions and at the same time the gears 43, 53 are revolved around the sun gears 41, 51, with maintaining this operatively coupled condition.

As shown in FIG. 2, the third planetary transmission mechanism 60 includes the sun gear 62, a plurality of planetary gears 65 meshing with the sun gear 62 at a plurality of positions along the outer periphery of this sun gear 62, the ring gear 63 having an inner gear portion meshing with the plurality of planetary gears 65 and a carrier 64 supported to be revolved around the sun gear 62.

As shown in FIG. 2, the brake 90 is a hydraulic brake, which can be switched over between an engaged condition in which the brake non-rotatably fixes the ring gear 63 of the third planetary transmission mechanism 60 in response to supply of operating oil pressure thereto and a disengaged condition in which the brake releases the fixation of the ring gear 63 in response to discharge of the operating oil pressure therefrom.

As shown in FIG. 2, the clutch section C includes a first clutch 73 having an input side rotational member 73a operatively coupled, via the operative coupling mechanism 100 having a rotation transmission shaft 101, to the ring gear 52 of the second planetary transmission mechanism 50, a second clutch 74 having an input side rotational member 74a operatively coupled, via a sun gear shaft 55, with the sun gear 51 of the second planetary transmission mechanism 50 to be rotatable therewith, a third clutch 76 having an input side rotational member 76a operatively coupled, via an operative coupling mechanism 105 having a rotation coupling shaft 106, with the outer peripheral side of the common carrier 43, and a fourth clutch 78 having an input side rotational member 78a operatively coupled with an intermediate portion of a sun gear rotation transmission shaft 72 which operatively couples an output side rotational member 74b of the second clutch 74 with the sun gear 62 of the third planetary transmission mechanism 60 to be rotatable therewith.

The output side rotational member 73b of the first clutch 73 and the output side rotational member 74b of the second clutch 74 are constituted from a same member and are coupled, by the sun rotation coupling shaft 72, with the sun gear 62 of the third planetary transmission mechanism 60 to be rotatable therewith. The output side rotational member 76b of the third clutch 76 and the output side rotational member 78b of the fourth clutch 78 are constituted from a same member and are coupled, by a carrier rotation coupling shaft 79, with the carrier 64 of the third planetary transmission mechanism 60 to be rotatable therewith. The output side rotational member 73b of the first clutch 73 and the output side rotational member 74b of the second clutch 74 are coupled, via a sun rotation transmission shaft 72, with the input side rotational member 78a of the fourth clutch 78.

The operative coupling ratio of the two coupling gear portions 42a, 53a is set such that the planetary gears 42 of the first planetary transmission mechanism 40 and the planetary gears 53 of the second planetary transmission mechanism 50 are operatively coupled with each other to be rotated about their own respective axes under an operatively coupled condition: the coupling ratio=1. Further, the teeth number ratio (number of teeth of ring gear/number of teeth of sun gear) of each one of the first planetary transmission mechanism 40, the second planetary transmission mechanism 50 and the third planetary transmission mechanism 60, is set to 3.

Figure 6:
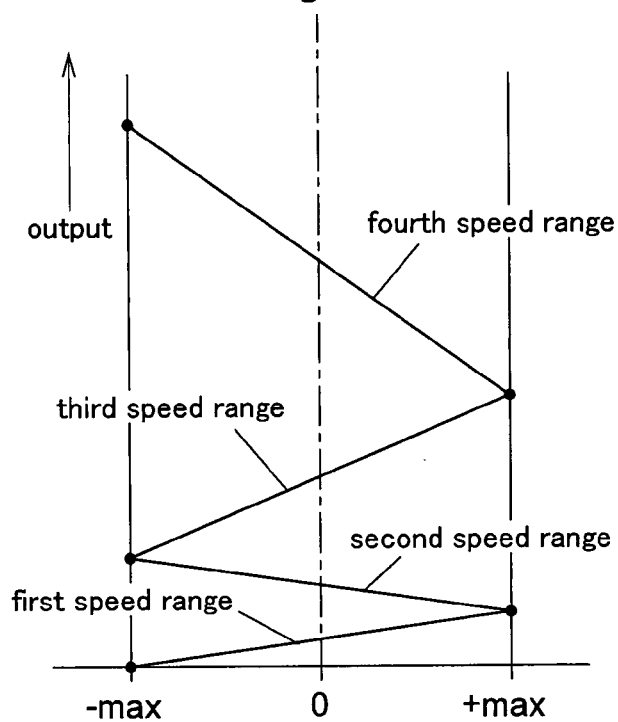
FIG. 6 is an explanatory view showing relationship between speed-changing conditions of a continuously variable speed-change device and outputs from a main speed-changing section.

With the above, in the main speed-changing section 23, the drive force transmitted from the engine 3 to the ring gear 44 of the first planetary transmission mechanism 40 without being subjected to the speed-changing action by the continuously variable speed-change device 30 and the drive force transmitted from the output shaft 31 of the continuously variable speed-change device 30 to the sun gear 41 of the first planetary transmission mechanism 40 are combined together by the first planetary transmission mechanism 40 and the second planetary transmission mechanism 50 of the planetary transmission section P. This combined drive force is transmitted by the clutch section C to the third planetary transmission mechanism 60, so that the force is outputted from the carrier shaft 61 of this third planetary transmission mechanism 60 to the forward/reverse switchover mechanism 80. FIG. 7 shows relationship between operational conditions of the respective clutches 73, 74, 76, 78 and the brake 90 and the speed ranges realized in the main speed-changing section 23. FIG. 6 shows the speed-changing conditions of the continuously variable speed-change device 30, the speed ranges of the main speed-changing section 23 and the output speeds from the carrier shaft 61 of the main speed-changing section 23, in correlation with each other. As shown, with appropriate operations of the respective clutches 73, 74, 76, 78 and the brake 90 and speed-changing operation of the continuously variable speed-change device 30, the main speed-changing section 23 is switched over into four speed ranges and in each speed range, the output rotational speed from the carrier shaft 61 is changed steplessly.

More particularly, when the first clutch 73 and the brake 90 are operated into the respective engaged condition, in the main speed-changing section 23, as shown in FIG. 8(A), the combined drive force from the first planetary transmission mechanism 40 and the second planetary transmission mechanism 50 is transmitted from the ring gear 52 of the second planetary transmission mechanism 50 via the operative coupling mechanism 100, the first clutch 73, the sun rotation transmission shaft 72 to the third planetary transmission mechanism 60, so that the force is outputted from the carrier shaft 61 of this third planetary transmission shaft 60, thereby providing a first speed range. And, as the continuously variable speed-change device 30 is operated from a speed-changing condition of a reverse rotation side maximum speed (−max) (to be referred to as "maximum reverse rotation condition" hereinafter) to a speed-changing condition of a forward rotation side maximum speed (+max) (to be referred to as "maximum forward rotation condition" hereinafter), the output rotational speed from the carrier shaft 61 is progressively increased.

When the second clutch 74 and the brake 90 are operated into the respective engaged condition, in the main speed-changing section 23, as shown in FIG. 8(B), the combined drive force from the first planetary transmission mechanism 40 and the second planetary transmission mechanism 50 is transmitted from the sun gear 51 of the second planetary transmission mechanism 50 via the sun gear shaft 55, the second clutch 74, the sun rotation transmission shaft 72 to the third planetary transmission mechanism 60, so that the force is outputted from the carrier shaft 61 of this third planetary transmission shaft 60, thereby providing a second speed range. And, as the continuously variable speed-change device 30 is operated from the maximum forward rotation condition to the maximum reverse rotation condition, the output rotational speed from the carrier shaft 61 is progressively increased.

When the second clutch 74 and the third clutch 76 are operated into the respective engaged conditions, as shown in FIG. 9(C), the combined drive force from the first planetary transmission mechanism 40 and the second planetary transmission mechanism 50 is transmitted from the common carrier 43 via the operative coupling mechanism 100, the third clutch 76 to the carrier 74 of the third planetary transmission mechanism 60 and also from the sun gear 51 of the second planetary transmission mechanism 50 via the sun gear shaft 55, the second clutch 74, the sun rotation transmission shat 72 to the sun gear 62 of the third planetary transmission mechanism 60, respectively, so that the force is outputted from the carrier shaft 61 of this third planetary transmission shaft 60, thereby providing a third speed range. And, as the continuously variable speed-change device 30 is operated from the maximum reverse rotation condition to the maximum forward rotation condition, the output rotational speed from the carrier shaft 61 is progressively increased.

When the second clutch 74 and the fourth clutch 78 are operated into the respective engaged conditions, as shown in FIG. 9(D), the combined drive force from the first planetary transmission mechanism 40 and the second planetary transmission mechanism 50 is transmitted from the sun gear 51 of the second planetary transmission mechanism 50 via the second clutch 74 and the fourth clutch 78 to the third planetary transmission mechanism 60, thereby driving the sun gear 62 and the carrier shaft 61 of the third planetary transmission mechanism 60 at a same speed. And, as the continuously variable speed-change device 30 is operated from the maximum forward rotation condition to the maximum reverse rotation condition, the output rotational speed from the carrier shaft 61 is progressively increased.

And, the speed-changing operations are possible with maintaining the continuity from the stop condition to the maximum speed. First, for the continuity from the stop condition, the minimum speed in the first speed range is zero. That is, when the rotational speed of the continuously variable speed-change device 30 functioning as the sun gear shaft of the first planetary transmission mechanism 40 becomes the rotational speed under the maximum reverse rotation condition of the continuously variable speed-change device 30, the rotational speed of the ring gear 52 of the second planetary transmission mechanism 50 becomes zero. The output rotational speed from the carrier shaft 61 of the third planetary transmission mechanism 60 when a speed-changing operation is effected to the maximum speed in the first speed range becomes equal to the output rotational speed from the carrier shaft 61 of the third planetary transmission mechanism 60 when a speed-changing operation is effected to the minimum speed in the second speed range.

The output rotational speed from the carrier shaft 61 of the third planetary transmission mechanism 60 when a speed-changing operation is effected to the maximum speed in the second speed range becomes equal to the output rotational speed from the carrier shaft 61 of the third planetary transmission mechanism 60 when a speed-changing operation is effected to the minimum speed in the third speed range. The output rotational speed from the carrier shaft 61 of the third planetary transmission mechanism 60 when a speed-changing operation is effected to the maximum speed in the third speed range becomes equal to the output rotational speed from the carrier shaft 61 of the third planetary transmission mechanism 60 when a speed-changing operation is effected to the minimum speed in the fourth speed range. Further, between the first and second speed ranges, between the second and third speed ranges and also between the third and fourth speed ranges, the rotational speeds of the sun gears, the ring gears and the carriers of all of the first, second and third planetary transmission mechanisms 40, 50 and 60 vary in a continuous manner and without any break in the driving torques in any of the first, second and third planetary transmission mechanisms 40, 50 and 60.

That is, in the first speed range, when the continuously variable speed-change device 30 is under the maximum reverse rotation condition, the ring gear 52 is at zero rotation to connect the first clutch 73 to transmit the force to the sun gear 62 of the third planetary transmission mechanism 60, and the ring gear 63 is stopped by the brake 90, thus rendering the output rotation zero.

In the case of switchover to the second speed range, when the continuously variable speed-change device 30 becomes the maximum forward rotation condition, and when the input side rotational member 73a of the first clutch 73 and the input side rotational member 74a of the second clutch 74 reach a same rotational speed, the second clutch 74 is engaged and the first clutch 73 is disengaged. As the switchover operations take place at the same rotational speed, there occurs no problem even when both the first clutch 73 and the second clutch 74 are under the engaged conditions, any interruption in the torque transmission can be avoided.

In the case of switchover to the third speed range, when the continuously variable speed-change device 30 becomes the maximum reverse rotation condition, and when the carrier shaft 61, the carrier 64, the carrier rotation transmission shaft 79, the output side rotational member 76b of the third clutch 76 and the input side rotational member 76a of the third clutch 76 reach a same rotational speed, the third clutch 76 is switched over into the engaged condition and the brake 90 is switched over into the disengaged condition when the rotation of the ring gear 63 of the planetary transmission mechanism 60 becomes zero.

In the case of switchover to the fourth speed range, the continuously variable speed-change device 30 becomes the maximum forward rotation condition, and when the input side rotational member 76a of the third clutch 76 and the input side rotational member 78a of the fourth clutch 78 reach a same rotational speed, the fourth clutch 78 is switched over into the disengaged condition and the third clutch 76 is switched over into the disengaged condition.

As shown in FIG. 2, the forward/reverse switchover mechanism 80 includes the forward clutch 81 having the input side rotational member 81a connected to the rear end of the carrier shaft 61 of the third planetary transmission mechanism 60 functioning as the output shaft of the main speed-changing section 23 to be rotatable therewith, a reverse gear mechanism 82 having an input gear 82a connected to the front end of the carrier shaft 61 to be rotatable therewith, a reverse clutch 84 having an input side rotational member 84a connected via a rotation transmission member 83 to an output gear 82b of the reverse gear mechanism 82, and the output shaft 22 connected via a rotation transmission member 85 to the output side rotational members 81b, 84b of the forward clutch 81 and the reverse clutch 84 to be rotatable therewith.

More particularly, as shown in FIG. 7 showing the relationship among the speed ranges of the main speed-changing section 23, the operational conditions of the forward/reverse switchover mechanism 80 and the operational conditions of the forward clutch 81 and the reverse clutch 84, when the forward clutch 81 is operated into the engaged condition, the forward/reverse switchover mechanism 80 enters the forward traveling condition in which the mechanism 80 transmits the output from the carrier shaft 61 of the main speed-changing section 23 via the forward clutch 81 to the output shaft 12 and then transmits the power from this output shaft 22 to the rear wheel differential mechanism 10 and the front wheel output shaft 12.

Incidentally, the mark "–" in FIG. 7 denotes the disengaged condition of the respective clutches 73, 74, 76, 78, the brake 90, the forward clutch 81 and the reverse clutch 84. The mark "0" on the horizontal axis in FIG. 6 represents the neutral condition of the continuously variable speed-change device 30.

Figure 5:
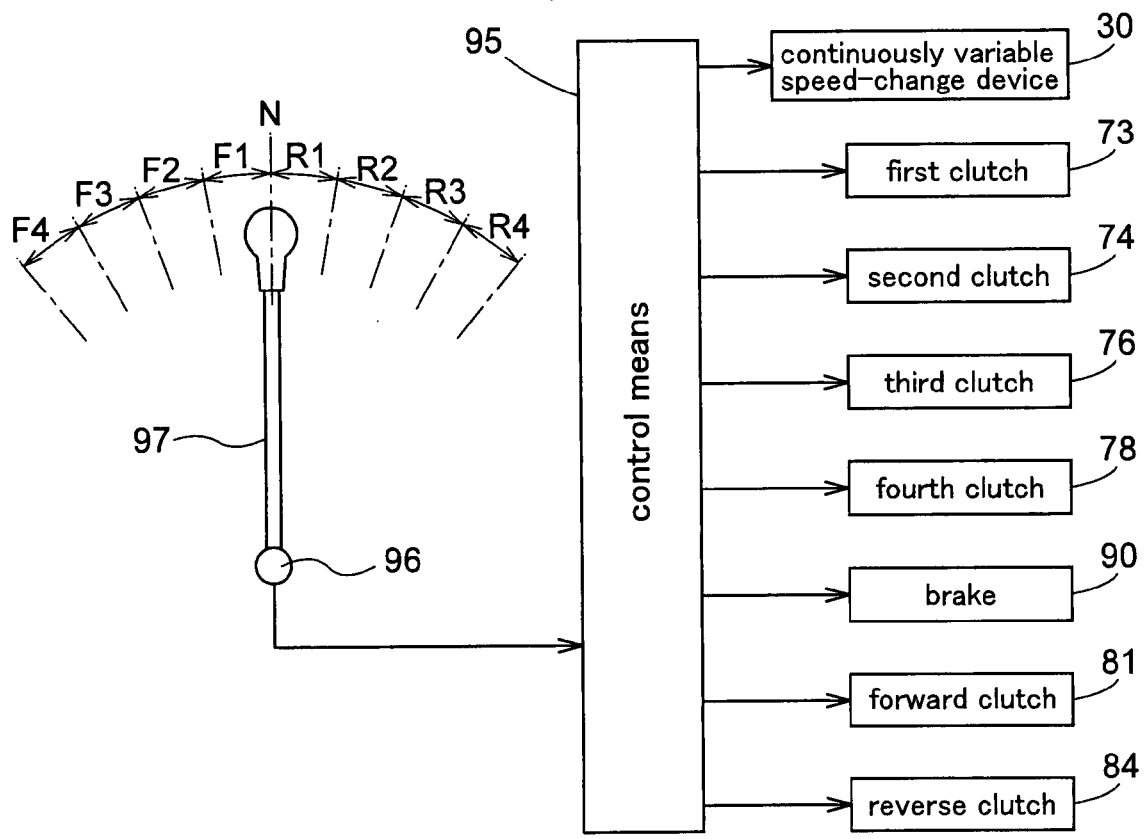
FIG. 5 is a block diagram of a speed-changing operational line.

As shown in FIG. 5, the continuously variable speed-change device 30, the respective clutches 73, 74, 76, 78 of the clutch section C, the brake 90 of the third planetary transmission mechanism 60 and the forward clutch 81 and the reverse clutch 84 of the forward/reverse switchover mechanism 89 are operatively connected to a control means 95. To this control means 95, a speed-changing detecting means 96 is operatively connected.

The speed-changing detecting means 96 comprises a rotation potentiometer having a rotation operational portion operatively connected to a speed-changing lever 97 provided in the driving section. The speed-changing lever 97 is pivotally operable into a neutral position N, first through fourth forward speed ranges F1-F4 arranged forwardly of the neutral position N relative to the vehicle body and first through fourth reverse speed ranges R1-R4 arranged rearwardly of the neutral position N relative to the vehicle body.

Namely, the speed-changing detecting means 96 detects the operational position of the speed-changing lever 97 and converts this detection result into an electric signal and outputs this signal to the control means 95.

The control means 95 is constructed utilizing a microcomputer. Based on the detection information from the speed-changing detecting means 95 and a preinstalled program, the control means 95 effects the speed-changing or switchover operations of the continuously variable speed-change device 30, the respective clutches 73, 74, 76, 78 and the brake 90 of the main speed-changing section 23 and the switchover operations of the forward clutch 81 and the reverse clutch 84 of the forward/reverse switchover mechanism 80.

More particularly, in response to a pivotal operation of the speed-changing lever 97 along the fore and aft direction of the vehicle body, the control means 95 operates the main speed-changing section 23 and the forward/reverse switchover mechanism 80 into respective operational conditions corresponding to the operational position of the speed-changing lever 97, so that the vehicle body can travel to the forward side or reverse side with stepless change in its traveling speed or the vehicle body can be stopped also.

That is, when the speed-changing lever 97 is operated to the neutral position N, the control means 95 operates all of the first through fourth clutches 73, 74, 76, 78 of the main speed-changing section 23 into the disengaged conditions, so that the speed-change transmission apparatus 20 is rendered into the neutral condition, thus stopping the power transmission to the right and left front wheels 1 and the right and left rear wheels 2, whereby the vehicle body is stopped.

Incidentally, in place of the above-described construction wherein when the speed-changing lever 97 is operated to the neutral position N, the control means 95 operates all of the first through fourth clutches 73, 74, 76, 78 of the main speed-changing section 23 into the disengaged conditions, so that the speed-change transmission apparatus 20 is rendered into the neutral condition, it is possible to employ a modified construction wherein the speed-change transmission apparatus 20 is rendered into the neutral condition when the control means 95 disengages the forward clutch 81 and the reverse clutch 84 of the forward/reverse switchover mechanism 80.

When the speed-changing lever 97 is operated to the forward first speed range F1, the control means 95 engages the first clutch 73 and the brake 90, so that the main speed-changing section 23 is rendered into the first speed range. Also, the control means 95 engages the forward clutch 81, so that the forward/reverse switchover mechanism 80 is rendered into the forward traveling condition. So that, the speed-change transmission apparatus 20 renders the drive force from the engine 3 into the forward driving force to be transmitted to the right and left rear wheels 2 and the right and left front wheels 1, whereby the vehicle body travels forwardly. In the course of this, as the speed-changing lever 97 is progressively operated with increasing operational stroke toward the side (front side of the vehicle body) away from the neutral position N of the speed-changing lever 97, the control means 95 effects a speed-changing operation of the continuously variable speed-change device 30 from the maximum reverse rotation condition to the maximum forward rotation condition, so that the output rotation speed from the carrier shaft 61 of the main speed-changing section 23 is increased steplessly and the forward traveling speed of the vehicle body is also increased steplessly in correspondence therewith. When the speed-changing lever 97 is operated to the forward-most position (maximum speed position) in the forward first speed range F1, the control means 95 effects a speed-changing operation of the continuously variable speed-change device 30 to the maximum forward rotation condition, so that the main speed-changing section 23 is rendered into the maximum speed condition in the first speed range and the output rotational speed from the carrier shaft 61 in the first speed range becomes the maximum speed and the traveling speed of the vehicle body in the forward first speed range becomes the maximum speed.

When the speed-changing lever 97 is operated to the forward second speed range F2, the control means 95 engages the second clutch 74 and the brake 90, so that the main speed-changing section 23 is rendered into the second speed range. Also, the control means 95 engages the forward clutch 81, so that the forward/reverse switchover mechanism 80 is rendered into the forward traveling condition. So that, the speed-change transmission apparatus 20 renders the drive force from the engine 3 into the forward driving force to be transmitted to the right and left rear wheels 2 and the right and left front wheels 1, whereby the vehicle body travels forwardly. In the course of this, as the speed-changing lever 97 is progressively operated with increasing operational stroke toward the side (front side of the vehicle body) away from the neutral position N of the speed-changing lever 97, the control means 95 effects a speed-changing operation of the continuously variable speed-change device 30 from the maximum forward rotation condition to the maximum reverse rotation condition, so that the output rotation speed from the carrier shaft 61 of the main speed-changing section 23 is increased steplessly and the forward traveling speed of the vehicle body is also increased steplessly in correspondence therewith.

When the speed-changing lever 97 is operated to the forward-most position (maximum speed position) in the forward second speed range F2, the control means 95 effects a speed-changing operation of the continuously variable speed-change device 30 to the maximum reverse rotation condition, so that the main speed-changing section 23 is rendered into the maximum speed condition in the second speed range and the output rotational speed from the carrier shaft 61 in the second speed range becomes the maximum speed and the traveling speed of the vehicle body in the forward second speed range becomes the maximum speed. In the case of the speed-changing lever 97 operated to the rear-most position (lowest speed position) in the forward second speed range F2 and in the case of the speed-changing lever 97 operated to the forward-most position (highest speed position) in the forward first speed range F1, the output rotational speeds from the carrier shaft 61 of the main speed-changing section 23 become the same, so that the forward traveling speed of the vehicle body too becomes the same.

When the speed-changing lever 97 is operated to the forward third speed range F3, the control means 95 engages the second clutch 74 and the third clutch 76, so that the main speed-changing section 23 is rendered into the third speed range. Also, the control means 95 engages the forward clutch 81, so that the forward/reverse switchover mechanism 80 is rendered into the forward traveling condition. So that, the speed-change transmission apparatus 20 renders the drive force from the engine 3 into the forward driving force to be transmitted to the right and left rear wheels 2 and the right and left front wheels 1, whereby the vehicle body travels forwardly. In the course of this, as the speed-changing lever 97 is progressively operated with increasing operational stroke toward the side (front side of the vehicle body) away from the neutral position N of the speed-changing lever 97, the control means 95 effects a speed-changing operation of the continuously variable speed-change device 30 from the maximum reverse rotation condition to the maximum forward rotation condition, so that the output rotation speed from the carrier shaft 61 of the main speed-changing section 23 is increased steplessly and the forward traveling speed of the vehicle body is also increased steplessly in correspondence therewith.

When the speed-changing lever 97 is operated to the forward-most position (maximum speed position) in the forward third speed range F3, the control means 95 effects a speed-changing operation of the continuously variable speed-change device 30 to the maximum forward rotation condition, so that the main speed-changing section 23 is rendered into the maximum speed condition in the third speed range and the output rotational speed from the carrier shaft 61 in the third speed range becomes the maximum speed and the traveling speed of the vehicle body in the forward third speed range becomes the maximum speed. In the case of the speed-changing lever 97 operated to the rear-most position (lowest speed position) in the forward third speed range F3 and in the case of the speed-changing lever 97 operated to the forward-most position (highest speed position) in the forward second speed range F2, the output rotational speeds from the carrier shaft 61 of the main speed-changing section 23 become the same, so that the forward traveling speed of the vehicle body too becomes the same.

When the speed-changing lever 97 is operated to the forward fourth speed range F4, the control means 95 engages the second clutch 74 and the fourth clutch 78, so that the main speed-changing section 23 is rendered into the fourth speed range. Also, the control means 95 engages the forward clutch 81, so that the forward/reverse switchover mechanism 80 is rendered into the forward traveling condition. So that, the speed-change transmission apparatus 20 renders the drive force from the engine 3 into the forward driving force to be transmitted to the right and left rear wheels 2 and the right and left front wheels 1, whereby the vehicle body travels forwardly. In the course of this, as the speed-changing lever 97 is progressively operated with increasing operational stroke toward the side (front side of the vehicle body) away from the neutral position N of the speed-changing lever 97, the control means 95 effects a speed-changing operation of the continuously variable speed-change device 30 from the maximum forward rotation condition to the maximum reverse rotation condition, so that the output rotation speed from the carrier shaft 61 of the main speed-changing section 23 is increased steplessly and the forward traveling speed of the vehicle body is also increased steplessly in correspondence therewith.

When the speed-changing lever 97 is operated to the forward-most position (maximum speed position) in the forward fourth speed range F4, the control means 95 effects a speed-changing operation of the continuously variable speed-change device 30 to the maximum reverse rotation condition, so that the main speed-changing section 23 is rendered into the maximum speed condition in the fourth speed range and the output rotational speed from the carrier shaft 61 in the fourth speed range becomes the maximum speed and the traveling speed of the vehicle body in the forward fourth speed range becomes the maximum speed. In the case of the speed-changing lever 97 operated to the rear-most position (lowest speed position) in the forward fourth speed range F4 and in the case of the speed-changing lever 97 operated to the forward-most position (highest speed position) in the forward third speed range F3, the output rotational speeds from the carrier shaft 61 of the main speed-changing section 23 become the same, so that the forward traveling speed of the vehicle body too becomes the same.

When the speed-changing lever 97 is operated to the reverse first speed range R1, the control means 95 engages the first clutch 73 and the brake 90, so that the main speed-changing section 23 is rendered into the first speed range. Also, the control means 95 engages the reverse clutch 84, so that the forward/reverse switchover mechanism 80 is rendered into the reverse traveling condition. So that, the speed-change transmission apparatus 20 renders the drive force from the engine 3 into the reverse driving force to be transmitted to the right and left rear wheels 2 and the right and left front wheels 1, whereby the vehicle body travels reversely. In the course of this, as the speed-changing lever 97 is progressively operated with increasing operational stroke toward the side (rear side of the vehicle body) away from the neutral position N of the speed-changing lever 97, the control means 95 effects a speed-changing operation of the continuously variable speed-change device 30 from the maximum reverse rotation condition to the maximum forward rotation condition, so that the output rotation speed from the carrier shaft 61 of the main speed-changing section 23 is increased steplessly and the reverse traveling speed of the vehicle body is also increased steplessly in correspondence therewith.

When the speed-changing lever 97 is operated to the rear-most position (maximum speed position) in the reverse first speed range R1, the control means 95 effects a speed-changing operation of the continuously variable speed-change device 30 to the maximum forward rotation condition, so that the main speed-changing section 23 is rendered into the maximum speed condition in the first speed range and the output rotational speed from the carrier shaft 61 in the first speed range becomes the maximum speed and the traveling speed of the vehicle body in the reverse first speed range becomes the maximum speed.

When the speed-changing lever 97 is operated to the reverse second speed range R2, the control means 95 engages the second clutch 74 and the brake 90, so that the main speed-changing section 23 is rendered into the second speed range. Also, the control means 95 engages the reverse clutch 84, so that the forward/reverse switchover mechanism 80 is rendered into the reverse traveling condition. So that, the speed-change transmission apparatus 20 renders the drive force from the engine 3 into the reverse driving force to be transmitted to the right and left rear wheels 2 and the right and left front wheels 1, whereby the vehicle body travels forwardly. In the course of this, as the speed-changing lever 97 is progressively operated with increasing operational stroke toward the side (rear side of the vehicle body) away from the neutral position N of the speed-changing lever 97, the control means 95 effects a speed-changing operation of the continuously variable speed-change device 30 from the maximum forward rotation condition to the maximum reverse rotation condition, so that the output rotation speed from the carrier shaft 61 of the main speed-changing section 23 is increased steplessly and the reverse traveling speed of the vehicle body is also increased steplessly in correspondence therewith.

When the speed-changing lever 97 is operated to the rear-most position (maximum speed position) in the reverse second speed range R2, the control means 95 effects a speed-changing operation of the continuously variable speed-change device 30 to the maximum reverse rotation condition, so that the main speed-changing section 23 is rendered into the maximum speed condition in the second speed range and the output rotational speed from the carrier shaft 61 in the second speed range becomes the maximum speed and the traveling speed of the vehicle body in the reverse second speed range becomes the maximum speed. In the case of the speed-changing lever 97 operated to the forward-most position (lowest speed position) in the reverse second speed range R2 and in the case of the speed-changing lever 97 operated to the rear-most position (highest speed position) in the reverse first speed range R1, the output rotational speeds from the carrier shaft 61 of the main speed-changing section 23 become the same, so that the reverse traveling speed of the vehicle body too becomes the same.

When the speed-changing lever 97 is operated to the reverse third speed range R3, the control means 95 engages the second clutch 74 and the third clutch 76, so that the main speed-changing section 23 is rendered into the third speed range. Also, the control means 95 engages the reverse clutch 84, so that the forward/reverse switchover mechanism 80 is rendered into the reverse traveling condition. So that, the speed-change transmission apparatus 20 renders the drive force from the engine 3 into the reverse driving force to be transmitted to the right and left rear wheels 2 and the right and left front wheels 1, whereby the vehicle body travels reversely. In the course of this, as the speed-changing lever 97 is progressively operated with increasing operational stroke toward the side (rear side of the vehicle body) away from the neutral position N of the speed-changing lever 97, the control means 95 effects a speed-changing operation of the continuously variable speed-change device 30 from the maximum reverse rotation condition to the maximum forward rotation condition, so that the output rotation speed from the carrier shaft 61 of the main speed-changing section 23 is increased steplessly and the reverse traveling speed of the vehicle body is also increased steplessly in correspondence therewith.

When the speed-changing lever 97 is operated to the rear-most position (maximum speed position) in the reverse third speed range R3, the control means 95 effects a speed-changing operation of the continuously variable speed-change device 30 to the maximum forward rotation condition, so that the main speed-changing section 23 is rendered into the maximum speed condition in the third speed range and the output rotational speed from the carrier shaft 61 in the third speed range becomes the maximum speed and the traveling speed of the vehicle body in the reverse third speed range becomes the maximum speed. In the case of the speed-changing lever 97 operated to the forward-most position (lowest speed position) in the reverse third speed range R3 and in the case of the speed-changing lever 97 operated to the rear-most position (highest speed position) in the reverse second speed range R2, the output rotational speeds from the carrier shaft 61 of the main speed-changing section 23 become the same, so that the forward traveling speed of the vehicle body too becomes the same.

When the speed-changing lever 97 is operated to the reverse fourth speed range R4, the control means 95 engages the second clutch 74 and the fourth clutch 78, so that the main speed-changing section 23 is rendered into the fourth speed range. Also, the control means 95 engages the reverse clutch 84, so that the forward/reverse switchover mechanism 80 is rendered into the reverse traveling condition. So that, the speed-change transmission apparatus 20 renders the drive force from the engine 3 into the reverse driving force to be transmitted to the right and left rear wheels 2 and the right and left front wheels 1, whereby the vehicle body travels reversely. In the course of this, as the speed-changing lever 97 is progressively operated with increasing operational stroke toward the side (rear side of the vehicle body) away from the neutral position N of the speed-changing lever 97, the control means 95 effects a speed-changing operation of the continuously variable speed-change device 30 from the maximum forward rotation condition to the maximum reverse rotation condition, so that the output rotation speed from the carrier shaft 61 of the main speed-changing section 23 is increased steplessly and the reverse traveling speed of the vehicle body is also increased steplessly in correspondence therewith.

When the speed-changing lever 97 is operated to the rear-most position (maximum speed position) in the reverse fourth speed range R4, the control means 95 effects a speed-changing operation of the continuously variable speed-change device 30 to the maximum reverse rotation condition, so that the main speed-changing section 23 is rendered into the maximum speed condition in the fourth speed range and the output rotational speed from the carrier shaft 61 in the fourth speed range becomes the maximum speed and the traveling speed of the vehicle body in the reverse fourth speed range becomes the maximum speed. In the case of the speed-changing lever 97 operated to the forward-most position (lowest speed position) in the reverse fourth speed range R4 and in the case of the speed-changing lever 97 operated to the rear-most position (highest speed position) in the reverse third speed range R3, the output rotational speeds from the carrier shaft 61 of the main speed-changing section 23 become the same, so that the reverse traveling speed of the vehicle body too becomes the same.

Incidentally, the control means 95 detects, based on the detection information obtained by the speed-changing detecting means 96 and detection information obtained by an output detecting sensor (not shown) which detects the rotational speed of the carrier shaft 61, arrival or non-arrival at a speed range switchover point between the first speed range and the second speed range, a speed range switchover point between the second speed range and the third speed range, and a speed range switchover point between the third speed range and the fourth speed range.

Next, the clutch section C will be described in greater details.

As shown in FIG. 10, the first clutch 73 includes the input side rotational member 73a comprised of a rotary member rotatably supported on the sun rotation transmission shaft 72 via a bearing 72a, the output side rotational member 73b comprised of an end of the sun rotation transmission shaft 72, and a cylindrical clutch member 75 slidably fitted on this output side rotational member 73b. The first clutch 73 is constructed as a meshing clutch.

As shown in FIG. 10, the second clutch 74 includes the input side rotational member 74a comprised of a rotary member supported on an end of the sun gear shaft 75 to be rotatable therewith, the output side rotational member 74b acting also as the output side rotational member 73b of the first clutch 73, and the clutch member 75 used also as the clutch member 75 of the first clutch 73. The clutch member 75 is spline-engaged to the output side rotational members 73b, 74b to be rotatable therewith and slidable relative thereto.

More particularly, when the clutch member 75 is slid along the output side rotational members 73b, 74b and the end 75a of the clutch member 75 engages with a clutch gear portion 73g of the input side rotational member 73a, the clutch member 75, at this time too, remains engaged with the output side rotational member 73b, and under the engaged condition engaged with the input side rotational member 73a and the output side rotational member 73b, so that the first clutch 73 is rendered into the engaged condition for operatively coupling the input side rotational member 73a and the output side rotational member 73b via the clutch member 75 for rotating them in unison. When the end 75a of the clutch member 75 is disengaged from the clutch gear portion 73g of the input side rotational member 73a, the clutch member 75 is rendered into the disengaged condition disengaged from the input side rotational member 73a, so that the first clutch 73 is rendered into the disengaged condition for allowing relative rotation between the input side rotational member 73a and the output side rotational member 73b.

When the end 75b of the clutch member 75 is engaged with the clutch gear portion 74g of the input side rotational member 74a, the clutch member 75, at this time too, remains engaged with the output side rotational member 74b and under the engaged condition engaged with the input side rotational member 74a and the output side rotational member 74b, so that the second clutch 74 is rendered into the engaged condition for operatively coupling the input side rotational member 74a and the output side rotational member 74b via the clutch member 75 for rotating them in unison. When the end 75b of the clutch member 75 is disengaged from the clutch gear portion 74g of the input side rotational member 74a, the clutch member 75 is rendered into the disengaged condition disengaged from the input side rotational member 74a, so that the second clutch 74 is rendered into the disengaged condition for allowing relative rotation between the input side rotational member 74a and the output side rotational member 74b.

As shown in FIG. 10, the third clutch 76 includes the input side rotational member 76a comprised of a rotary member rotatably supported on an intermediate portion of the carrier rotation transmission shaft 79 via a bearing 79a, the output side rotational member 76b comprised of an end of the sun rotation transmission hollow shaft 79, and a cylindrical clutch member 77 slidably fitted on this output side rotational member 76b. The third clutch 76 is constructed as a meshing clutch.

As shown in FIG. 10, the fourth clutch 78 includes the input side rotational member 78a comprised of a rotary member supported on an intermediate portion of the sun rotation transmission shaft 72 to be rotatable therewith, the output side rotational member 78b acting also as the output side rotational member 76b of the third clutch 76, and the clutch member 77 used also as the clutch member 77 of the third clutch 76. The clutch member 77 is spline-engaged to the output side rotational members 76b, 78b to be rotatable therewith and slidable relative thereto.

More particularly, when the clutch member 77 is slid along the output side rotational members 76b,78b and the end 77a of the clutch member 77 engages with a clutch gear portion 76g of the input side rotational member 76a, the clutch member 77, at this time too, remains engaged with the output side rotational member 76b, and under the engaged condition engaged with the input side rotational member 76a and the output side rotational member 76b, so that the third clutch 76 is rendered into the engaged condition for operatively coupling the input side rotational member 76a and the output side rotational member 76b via the clutch member 77 for rotating them in unison. When the end 77a of the clutch member 77 is disengaged from the clutch gear portion 76g of the input side rotational member 76b, the clutch member 77 is rendered into the disengaged condition disengaged from the input side rotational member 76a, so that the third clutch 76 is rendered into the disengaged condition for allowing relative rotation between the input side rotational member 76a and the output side rotational member 76b.

When the end 77b of the clutch member 77 is engaged with the clutch gear portion 78g of the input side rotational member 78a, the clutch member 77, at this time too, remains engaged with the output side rotational member 78b and under the engaged condition engaged with the input side rotational member 78a and the output side rotational member 78b, so that the fourth clutch 78 is rendered into the engaged condition for operatively coupling the input side rotational member 78a and the output side rotational member 78b via the clutch member 77 for rotating them in unison. When the end 77b of the clutch member 77 is disengaged from the clutch gear portion 78g of the input side rotational member 78a, the clutch member 77 is rendered into the disengaged condition disengaged from the input side rotational member 78a, so that the fourth clutch 78 is rendered into the disengaged condition for allowing relative rotation between the input side rotational member 78a and the output side rotational member 78b.

As shown in FIG. 10, the operative coupling mechanism 105 operatively coupling the common carrier 43 of the planetary transmission section P and the input side rotational member 76a of the third clutch 76 of the clutch section C includes a planetary side transmission gear 107 meshing with a gear portion formed peripherally along the outer peripheral side of the common carrier 43 and rotatable about a rotational axis different from the rotational axis of the common carrier 43, a clutch side transmission gear 108 meshing with a gear portion formed peripherally along the outer peripheral side of the input side rotational member 76a of the third clutch 76 and rotatable about a rotational axis different from the rotational axis of the input side rotational member 76a, and the rotation coupling shaft 106 connected with this clutch side transmission gear 108 and the planetary side transmission gear 107. Both the planetary side transmission gear 107 and the clutch side transmission gear 108 are rotatably supported, via the rotation coupling shaft 106, with a support portion 5a of the rear transmission case 5.

The rotation coupling shaft 10 is key-connected to both the planetary side transmission gear 107 and the clutch side transmission gear 108 to be rotatable therewith so as to couple these two transmission gears 107, 108 for rotation in unison. With this, the operative coupling mechanism 105 operatively couples the common carrier 43 with the input side rotational member 76a of the third clutch 76 for co-rotation.

As shown in FIG. 10, the operative coupling mechanism 100 operatively coupling the ring gear 52 of the second planetary transmission mechanism 50 of the planetary transmission section P and the input side rotational member 73a of the first clutch 73 of the clutch section C includes a planetary side transmission gear 102 meshing with a gear portion formed peripherally along the outer peripheral side of the ring gear 52 and rotatable about a rotational axis different from the rotational axis of the ring gear 52, a clutch side transmission gear 103 meshing with a gear portion formed peripherally along the outer peripheral side of the input side rotational member 73a of the first clutch 73 and rotatable about a rotational axis different from the rotational axis of the input side rotational member 73a, and the rotation coupling shaft 101 connected to the clutch side transmission gear 103 and the planetary side transmission gear 10.

The rotation coupling shaft 101 is constructed as a hollow shaft fitted on the rotation coupling shaft 106 of the operative coupling mechanism 105 and supported to the rotation coupling shaft 106, via a bearing 109, to be rotatably operable. At one end of the rotation coupling shaft 101, the planetary side transmission gear 102 is formed integrally and at the other end of the rotation coupling shaft 101, the clutch side transmission gear 103a is formed integrally, respectively. The planetary side transmission gear 102 too is supported to the rotation coupling shaft 106 via the rotation coupling shaft 101. And, the rotation coupling shaft 101 And, the rotation coupling shaft 101 operatively couples the planetary side transmission gear 10-2 and the clutch side transmission gear 103 for rotation in unison together. With this, the operative coupling mechanism 100 operatively couples the ring gear 52 with the input side rotational member 73a of the third clutch 73 for their rotation.

As shown in FIG. 2, the clutch member 75 of the first clutch 73 and the second clutch 74 is operatively coupled with a clutch cylinder 112 having a hydraulic cylinder, via a shift fork 111 having a fork portion thereof rotatably engaged with this clutch portion 75. The clutch member 77 of the third clutch 76 and the fourth clutch 78 is operatively coupled with a clutch cylinder 114 having a hydraulic cylinder, via a shift fork 113 having a fork portion thereof rotatably engaged with this clutch portion 77. The control means 95 effects switchover operations of the first and second clutches 73, 74 by switching over a control valve (not shown) of the clutch cylinder 112 and effects switchover operations of the third and fourth clutches 76, 78 by switching over a control valve (not shown) of the clutch cylinder 114.

Figure 11:
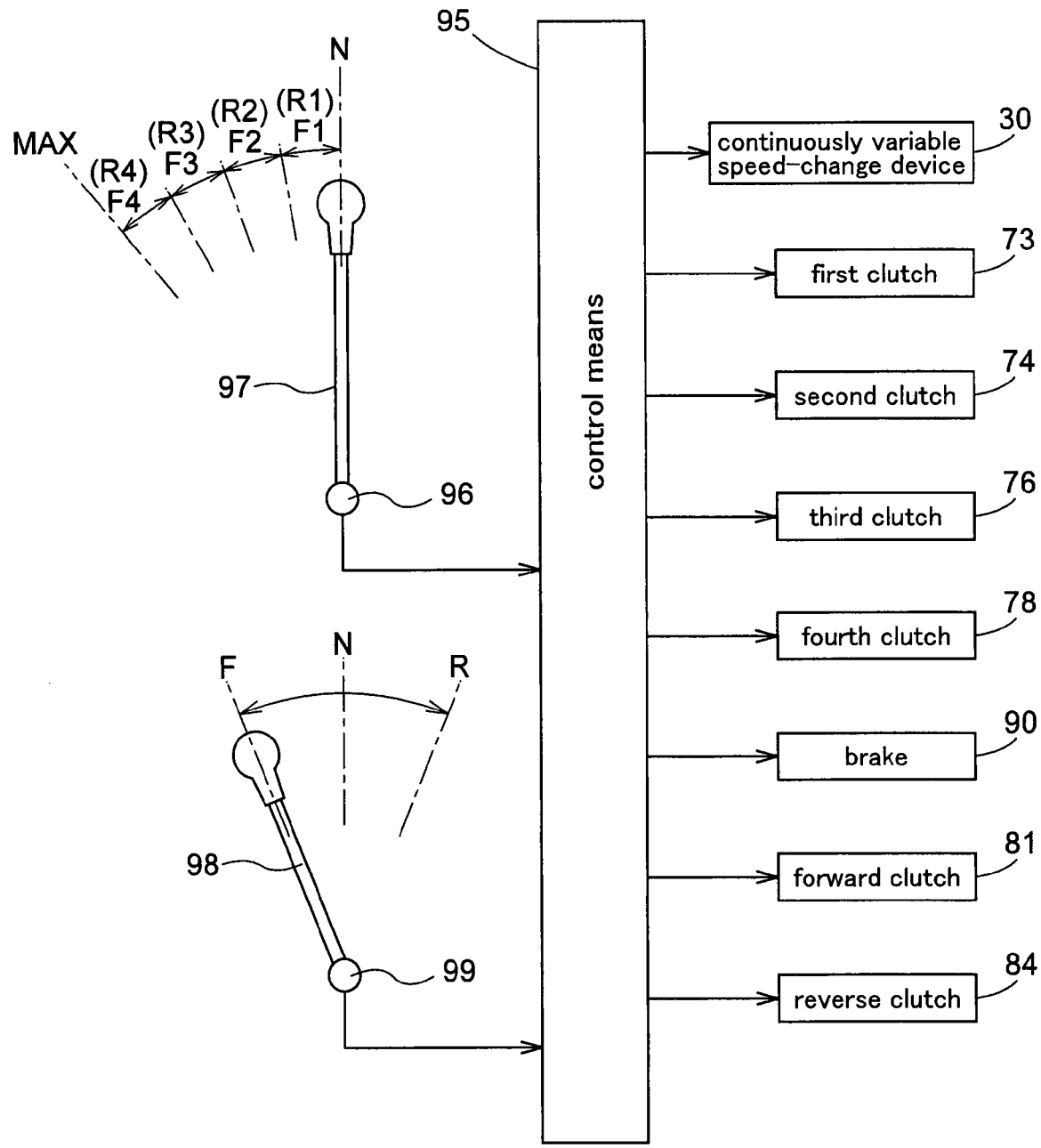
FIG. 11 is a block diagram of an operational line having a further embodiment.

FIG. 11 shows a speed-changing operation construction having a further embodiment. This speed-changing operation construction includes a speed-changing lever 97 switchable from a neutral position N to a maximum speed position MAX, a speed-changing detecting means 96 comprised of a potentiometer for detecting an operational position of the speed-changing lever 97, a forward/reverse lever 98 switchable between a forward position F and a reverse position R, a switchover detecting means 99 for detecting an operational position of this forward/reverse lever 98 and a control means 95 operatively connected with the speed-changing detecting means 96 and the switchover detecting means 99.

Based on the detection information obtained by the speed-changing detecting means 96, the control means 95 operates the continuously variable speed-change device 30, the first through fourth clutches 73, 74, 76, 78 and the brake 90 so as to realize a speed range and an output speed corresponding to the operational position of the speed-changing lever 97. Further, based on the detection information obtained by the switchover detecting means 99, the control means 95 also operates the forward clutch 81 and the reverse clutch 84 so as to realize a forward traveling condition or a reverse traveling condition corresponding to the operational position of the forward/reverse lever 98. Further, when the forward/reverse lever 98 is operated to the neutral position N, the control means 95 disengages the forward clutch 81 and the reverse clutch 84, thus stopping traveling of the vehicle.

Figure 12:
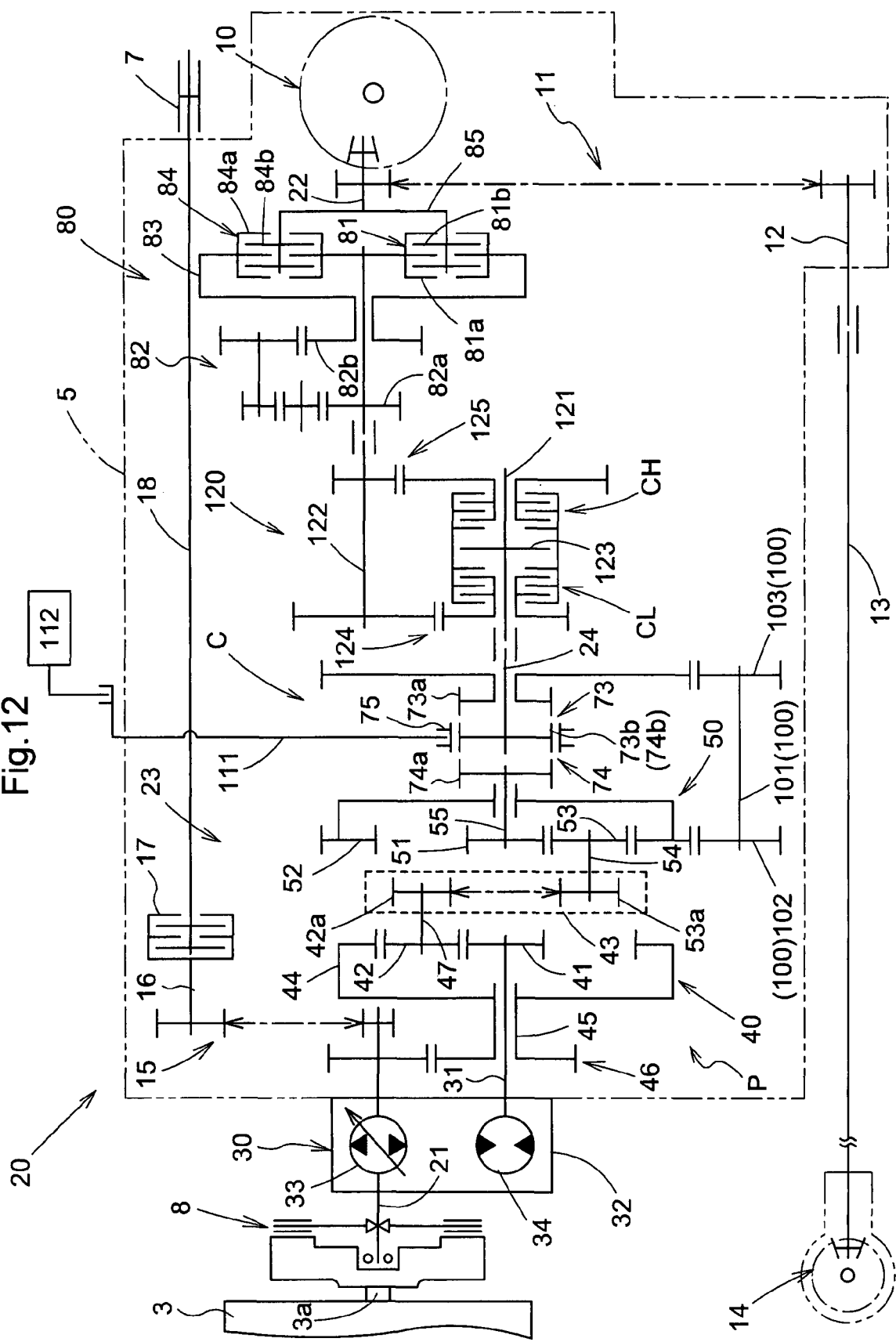
FIG. 12 is a diagram of a traveling transmission apparatus having a further embodiment.

FIG. 12 shows a speed-change transmission apparatus 20 having a further embodiment. This speed-change transmission apparatus 20 includes a main speed-changing section 23 having the continuously variable speed-change device 30, etc, an auxiliary speed-changing device 120 having an input shaft 121 receiving the output from the output shaft 24 of the main speed-changing section 23, and a forward/reverse switchover device 80 for receiving output from an output shaft 122 of this auxiliary speed-changing device 120.

This main speed-changing section 23 differs from the main speed-changing section 23 shown in FIG. 2 only in the clutch section C. Therefore, this clutch section C will be described next.

The clutch section C includes only two clutches, namely, a first clutch 73 having an input side rotational member 73a and a second clutch 74 having an input side rotational member 74a.

The first clutch 73 is constructed similarly to the first clutch 73 of the clutch section C shown in FIG. 2. Namely, this includes an input side rotational member 73a rotatably supported to the output shaft 24, an output side rotational member 73b supported to the output shaft 24, and a clutch member 75 splined on to the output side rotational member 73b to be slidable relative thereto and rotatable together. The first clutch 73 is constructed as a meshing clutch.

The input side rotational member 73a of this first clutch 73 is operatively coupled, via an operative coupling mechanism 100 similar to the operative coupling mechanism 100 of the first clutch 73 shown in FIG. 2, to a carrier 72 of the second planetary transmission mechanism 50 of the planetary transmission section P. In operation, when the clutch member 75 is slid into the engaged condition engaged with the output side rotational member 73b and the clutch gear portion of the input side rotational member 73a, the first clutch 73 is rendered into the engaged condition so as to couple the input side rotational member 73a and the output side rotational member 73b via the clutch member 75 for rotation in unison together and operatively couples the ring gear 52 of the second planetary transmission mechanism 50 with the output shaft 24. When the clutch member 75 is operated into the disengaged condition disengaged from the clutch gear portion of the input side rotational member 73a, the first clutch 73 is rendered into the disengaged condition for allowing relative rotation between the input side rotational member 73a and the output side rotational member 73b, thus releasing the operative coupling between the ring gear 52 of the second planetary transmission mechanism 50 and the output shaft 24.

The second clutch 74 is constructed similarly to the second clutch 74 of the clutch section C shown in FIG. 2. Namely, this includes an input side rotational member 74a connected to the sun support shaft 55 to be rotatable therewith, an output side rotational member 74b acting also as the output side rotational member 73b of the first clutch 73, and a clutch member 75 acting also as the clutch member 75 of the first clutch 73. The second clutch 74 is constructed as a meshing clutch.

In operation, when the clutch member 75 is slid into the engaged condition engaged with the output side rotational member 74b and the clutch gear portion of the input side rotational member 74a, the second clutch 74 is rendered into the engaged condition so as to couple the input side rotational member 74a and the output side rotational member 74b via the clutch member 75 for rotation in unison together and operatively couples the sun gear 51 of the second planetary transmission mechanism 50 with the output shaft 24. When the clutch member 75 is operated into the disengaged condition disengaged from the clutch gear portion of the input side rotational member 74a, the second clutch 74 is rendered into the disengaged condition for allowing relative rotation between the input side rotational member 74a and the output side rotational member 74b, thus releasing the operative coupling between the sun gear 51 of the second planetary transmission mechanism 50 and the output shaft 24.

The auxiliary speed-changing device 120 includes a high-speed clutch CH and a low-speed clutch CL having input side rotational members thereof operatively coupled via a rotation transmission member 123 with the input shaft 121, a low-speed transmission gear mechanism 124 operatively coupling an output side rotational member of the low-speed clutch CL with the output shaft 122 and a high-speed transmission gear mechanism 125 operatively coupling an output side rotational member of the high-speed clutch CH with the output shaft 122.

With the above in operation, when the low-speed clutch CL is operated into the engaged condition, the auxiliary speed-changing device 120 is rendered into a low speed condition in which the mechanism transmits the output from the output shaft 24 of the main speed-changing section 23 via the low-speed clutch CL and the low-speed transmission gear mechanism 124 to the output shaft 122 and from this output shaft 122 to the forward/reverse switchover mechanism 80. When the high-speed clutch CH is operated into the engaged condition, the auxiliary speed-changing device 120 is rendered into a high speed condition in which the mechanism transmits the output from the output shaft 24 of the main speed-changing section 23 via the high-speed clutch CH and the high-speed transmission gear mechanism 125 to the output shaft 122 and from this output shaft 122 to the forward/reverse switchover mechanism 80. The auxiliary speed-changing device 120 is constructed such that even when the rotational speed of the output shaft 24 of the main speed-changing section 23 is the same, under the high speed condition, this device rotates the output shaft 122 at a higher speed than under the low speed condition, so as to transmit the force from the input shaft 121 to the output shaft 122.

Figure 13:
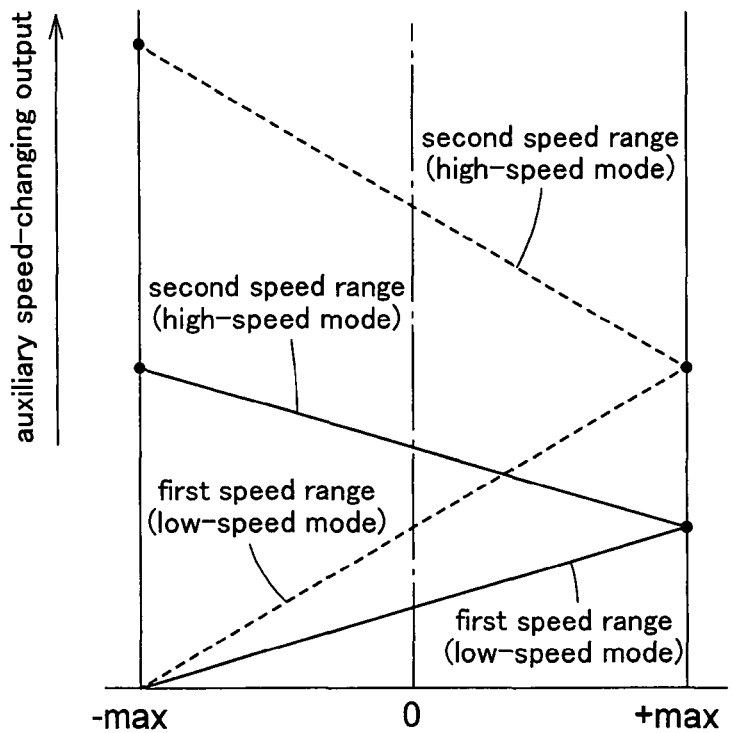
FIG. 13 is an explanatory view showing relationship between speed-changing conditions of a continuously variable speed-change device and auxiliary speed-changing outputs in a traveling transmission apparatus having a further embodiment.
Figure 14:
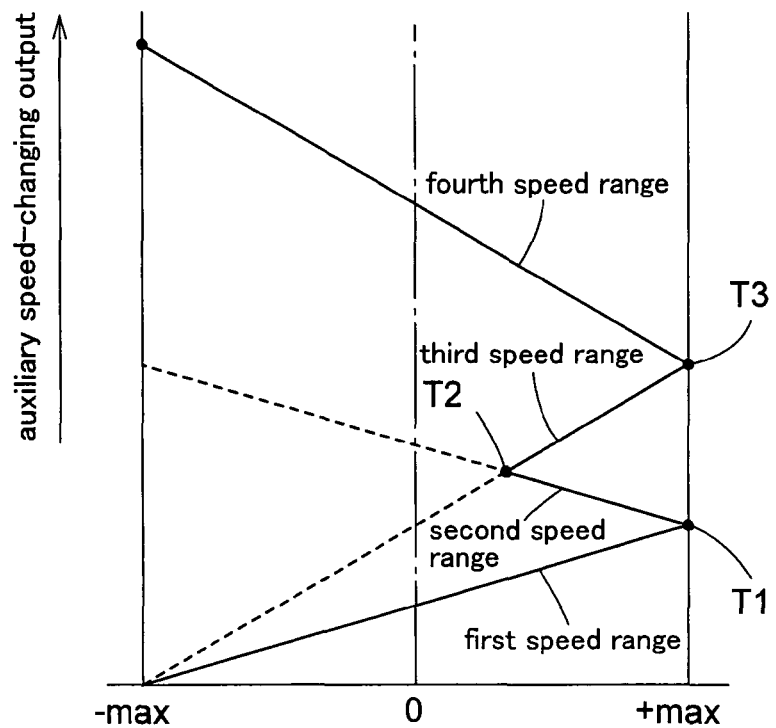
FIG. 14 is an explanatory view showing relationship between speed-changing conditions of a continuously variable speed-change device and auxiliary speed-changing outputs in a traveling transmission apparatus having a further embodiment.

More particularly, as shown in FIG. 15 showing the relationship among the speed-changing modes, the speed ranges realized by the main speed-changing section 23, the operational conditions of the first clutch 73 and the second clutch 74 of the clutch section C, and the operational conditions of the low-speed clutch CL and the high-speed clutch CH of the auxiliary speed-changing device 120, with this speed-change transmission apparatus 20, with appropriate switchover operations of the respective clutches 73, 74, CL, CH accompanied by speed-changing operations of the continuously variable speed-change device 30, there are provided auxiliary speed-changing outputs as shown in FIGS. 13 and 14.

That is to say, as shown with a solid line in FIG. 13, in the low speed mode, from a zero vehicle speed condition, the continuously variable speed-change device 30 is operated for changing speed from the maximum reverse rotation condition toward the maximum forward rotation condition, when there is provided the first speed range. As the continuously variable speed-change device 30 is speed-changed toward the maximum forward rotation condition, the auxiliary speed-changing output is steplessly increased. After the continuously variable speed-change device 30 has reached the maximum forward rotation condition, the continuously variable speed-change device 30 is operated from the maximum forward rotation condition toward the maximum reverse rotation condition, when there is provided the second speed range. As the continuously variable speed-change device 30 is speed-changed toward the maximum reverse rotation condition, the auxiliary speed-changing output is steplessly increased.

As shown by a broken line in FIG. 13, in the high speed mode, from the zero vehicle speed condition, the continuously variable speed-change device 30 is operated for changing speed from the maximum reverse rotation condition toward the maximum forward rotation condition, when there is provided the first speed range. As the continuously variable speed-change device 30 is speed-changed toward the maximum forward rotation condition, the auxiliary speed-changing output is steplessly increased. After the continuously variable speed-change device 30 has reached the maximum forward rotation condition, the continuously variable speed-change device 30 is operated from the maximum forward rotation condition toward the maximum reverse rotation condition, when there is provided the second speed range. As the continuously variable speed-change device 30 is speed-changed toward the maximum reverse rotation condition, the auxiliary speed-changing output is steplessly increased.

In this high speed mode, as the auxiliary speed-changing device 120 is fixed to the high speed condition, in either the first speed range or the second speed range, the auxiliary speed-changing output is higher than in the low-speed mode.

As shown in FIG. 14, in a multiple stage mode, from the zero vehicle speed condition, the continuously variable speed-change device 30 is operated for changing speed from the maximum reverse rotation condition toward the maximum forward rotation condition, when the first clutch 73 is operated into the engaged condition and the second clutch 74 is operated into the disengaged condition, respectively, such that the low-speed clutch CL is engaged and the auxiliary speed-changing device 12 is under the low-speed condition, thus providing the first speed range. As the continuously variable speed-change device 30 is speed-changed toward the maximum forward rotation condition, the auxiliary speed-changing output is steplessly increased. When the continuously variable speed-change device 30 reaches the maximum forward rotation condition and the speed range switchover point T1 is realized, then, the continuously variable speed-change device 30 is speed-changed from the maximum forward rotation condition toward the maximum reverse rotation condition, when the first clutch 73 is operated into the disengaged condition and the second clutch 74 is operated into the engaged condition, respectively, and also the low-speed clutch CL is operated to the engaged condition, so that the auxiliary speed-changing device 120 is under the low speed condition, thus providing the second speed range. As the continuously variable speed-change device 30 is speed-changed toward the maximum reverse rotation condition, the auxiliary speed-changing condition is steplessly increased.

When the continuously variable speed-change device 30 reaches a speed-changing condition of a predetermined speed, and the speed range switchover point T2 is reached, then, the continuously variable speed-change device 30 is operated toward the maximum forward rotation condition, when the first clutch 73 is switched over into the engaged condition and the second clutch 74 is switched over into the disengaged condition, respectively and the high-speed clutch CH is operated to the engaged condition, so that the auxiliary speed-changing device 120 is under the high speed condition, thus providing the third speed range. As the continuously variable speed-change device 30 is speed-changed toward the maximum forward rotation condition, the auxiliary speed-changing output is steplessly increased. When the continuously variable speed-change device 30 reaches the maximum forward rotation condition and the speed range switchover point T3 is reached, then, the continuously variable speed-change device 30 is operated from the maximum forward rotation condition toward the maximum reverse rotation condition, when the first clutch 73 is operated into the disengaged condition and the second clutch 74 is operated into the engaged condition, respectively and also the high-speed clutch CH is operated into the engaged condition, whereby the auxiliary speed-changing device 120 is rendered into the high speed condition, thus providing the fourth speed range. As the continuously variable speed-change device 30 is speed-changed toward the maximum reverse rotation condition, the auxiliary speed-changing output is steplessly increased.

With this speed-change transmission apparatus, the low-speed clutch CL and the high-speed clutch CH of the auxiliary speed-changing device 120, instead of the third clutch 76 and the fourth clutch 78 shown in FIG. 11, are operatively connected to the control means 95, so as to be speed-changed by a pivotal operation of the speed-changing lever 97. The control means 95 detects arrival or non-arrival at each speed range switchover point T1, T2, T3, based on the detection information obtained by the speed-changing detecting means 96 and an output detecting sensor (not shown) for detecting an output speed of the auxiliary speed-changing device 120.

Incidentally, the mark "engaged" shown in FIG. 15 represents the engaged condition of the respective clutches 73, 74, CL, CH and the mark "–" shown denotes the disengaged condition of the respective clutches 73, 74, CL, CH. Further, the mark "0" in the horizontal axis in FIGS. 13 and 14 represents the neutral condition of the continuously variable speed-change device 30.

FIG. 16 shows a speed-change transmission apparatus having a still further embodiment construction. This speed-change transmission apparatus includes an auxiliary speed-changing device 120 having a low-speed clutch CL and a high-speed clutch CH comprised of meshing clutches.

The low-speed clutch CL includes an input side rotational member 123 included in the input shaft 121 to be rotatable therewith, a clutch member 126 supported to this input side rotational member 123 to be rotatable therewith and slidable relative thereto, and a transmission gear 124a of a low-speed transmission gear mechanism 124.

That is, when the clutch member 126 is shifted to be engaged with a clutch gear portion 124b of the transmission gear 124a, the low-speed clutch CL is rendered into the engaged condition so as to transmit the drive force of the input side rotational member 123 via the clutch member 126 and the low-speed gear transmission mechanism 124 to the output shaft 12 and the auxiliary speed-changing device 120 is rendered into the low speed condition. When the clutch member 126 is disengaged from the clutch gear portion 124b of the transmission gear 124a, the low-speed clutch CL is rendered into the disengaged condition so as to break the force transmission from the input side rotational member 123 to the output shaft 122.

The high-speed clutch CH includes the input side rotational member 123, the clutch member 126, and a transmission gear 125a of a high-speed transmission mechanism 125.

That is, when the clutch member 126 is shifted to be engaged with a clutch gear portion 125b of the transmission gear 125a, the high-speed clutch CH is rendered into the engaged condition so as to transmit the drive force of the input side rotational member 123 via the clutch member 126 and the high-speed gear transmission mechanism 125 to the output shaft 12 and the auxiliary speed-changing device 120 is rendered into the high speed condition. When the clutch member 126 is disengaged from the clutch gear portion 125b of the transmission gear 125a, the high-speed clutch CH is rendered into the disengaged condition so as to break the force transmission from the input side rotational member 123 to the output shaft 122.

The clutch member 126 of the auxiliary speed-changing device 120 of this speed-change transmission apparatus is shift-operated by a clutch cylinder 116 via a shift fork 115 having a fork portion engaged with this clutch member 126.

Incidentally, the control means 95 detects the speed range switchover points, based on the detection information obtained by the speed-changing detecting means 96, detection information obtained by an output detecting sensor (not shown) for detecting the output speed of the main speed-changing section 23 or the auxiliary speed-changing device 120 and detection information obtained by an engine rotation sensor (not shown) for detecting an engine rotation speed.

More particularly, FIGS. 6, 13 and 14 show the relationship between the main speed-changing outputs or the auxiliary speed-changing outputs realized by speed-changing operations with maintaining the engine rotational speed at a set constant rotational speed and the operational conditions of the continuously variable speed-change device 30. In response to a change in the set rotational speed of the engine 3, there occurs a corresponding change in the entire output represented by the vertical axis in FIGS. 6, 13 and 14 as the main speed-changing output or the auxiliary speed-changing output realized thereby. Therefore, the control means 95 determines a speed-changing ratio, from the detected output speed obtained by the output detecting sensor adapted for detecting the output of the main speed-changing section 23 or the auxiliary speed-changing device 120 and the detected engine rotational speed obtained by the engine rotation sensor adapted for detecting the engine rotational speed and then effects switchover operations of the low-speed clutch CL and the high-speed clutch CH of the auxiliary speed-changing device 120, which this speed-changing ratio reaches a speed-changing ratio corresponding to the speed range switchover point T2.

Further, the control means 95 detects a maximum speed position +max and a minimum speed position −max, based on detection information from a swash plate angle sensor (not shown) adapted for detecting a swash plate angle of the continuously variable speed-change device 30, and detects the respective speed range switchover points shown in FIGS. 6 and 13 and the speed range switchover points T1, T3 shown in FIG. 14.

Other Embodiments

As the respective clutches 73, 74, 76, 78, instead of the clutch described in the foregoing embodiments where the clutch member 75, 76 is supported to the output side rotational member 73b, 74b, 76b, 78b, the object of the present invention can be achieved also, with using a clutch configured such that the clutch member is supported to the input side rotational member and the clutch is disengaged when the clutch member is detached from the output side rotational member.

The invention can be embodied, with using, as the respective clutches 73, 74, 76, 78, a clutch utilizing a synchronizing mechanism such as a synchromesh mechanism to be engaged and disengaged in a more smooth manner.

The invention can be embodied, with using, as the respective clutches 73, 74, 76, 78, a clutch configured such that the control valve of the clutch cylinder 112, 114 is operatively coupled with the control lever of the continuously variable speed-change device 30 via a hydraulic circuit, so that in response to a speed-changing operation of the continuously variable speed-change device 30, each clutch 73, 74, 76, 78 is automatically switched over into a predetermined engaged or disengaged condition. In this case too, with only a speed-changing operation of the continuously variable speed-change device 30, each speed range can be realized, so that a speed-changing operation can be effected easily.

INDUSTRIAL APPLICABILITY

The speed-change transmission apparatus of the present invention can be used in a utility vehicle such as a tractor.

DESCRIPTION OF REFERENCE NUMBERS 3 engine
24, 61 output shaft
30 continuously variable speed-change device
40, 50 planetary transmission mechanism
41 sun gear of first planetary transmission mechanism,
42 planetary gear of first planetary transmission mechanism,
43 common carrier
44 ring gear of first planetary transmission mechanism,
43, 52 rotational member of planetary transmission section,
53 planetary gear of second planetary transmission mechanism
73, 74, 76, 78 clutch
73a, 74a, 76a, 78a input side rotational member of clutch
73b, 74b, 76b, 78b output side rotational member of clutch
75, 77 clutch member
101, 106 rotation transmission shaft
102, 107 planetary side transmission gear
P planetary transmission section
C clutch section

The invention claimed is:
1. A speed-change transmission apparatus comprising:
a continuously variable speed-change device receiving a drive force from an engine;
a planetary transmission section having a plurality of planetary transmission mechanisms for combining an output from the continuously variable speed-change device and a drive force from the engine which is not subjected to a speed-changing action by the continuously variable speed-change device; and a clutch section having a plurality of clutches and outputting a drive force from said planetary transmission section to an output shaft wherein said output shaft outputs an output having a rotational speed corresponding to a speed-change position of the continuously variable speed-change device and an operational condition of each clutch, as the continuously variable speed-change device is operated and as said each clutch is switched over between an engaged condition and a disengaged condition;

wherein said each clutch of said clutch section comprises a meshing clutch including an input side rotational member for receiving the drive force from said planetary transmission section, an output side rotational member for outputting a drive force to said output shaft, and a clutch member;

said clutch member is switchable between an engaged condition where said clutch member is engaged with said input side rotational member and said output side rotational member so as to operatively couple said input side rotational member and said output side rotational member of a corresponding clutch and a disengaged condition where said clutch member is disengaged from said input side rotational member or said output side rotational member so as to allow relative rotation between said input side rotational member and said output side rotational member; and said planetary transmission section includes a first planetary transmission mechanism having a sun gear receiving the output from said continuously variable speed-change device and a ring gear receiving the drive force of the engine not affected by the speed-changing function of said continuously variable speed-change device, a second planetary transmission mechanism having a planetary gear operatively coupled with a planetary of said first planetary transmission mechanism, and a common carrier for supporting the planetary gear of said first planetary transmission mechanism and the planetary gear of said second planetary transmission mechanism such that the planetary gear of said first planetary transmission mechanism and the planetary gear of said second planetary transmission mechanism are revolved in unison.

2. The speed-change transmission apparatus according to claim 1, wherein said clutch section includes two clutches.

3. The speed-change transmission apparatus according to claim 1, wherein said clutch section includes four clutches.

4. The speed-change transmission apparatus according to claim 1, further comprising:

a planetary side transmission gear operatively meshed with a rotational member of said planetary transmission section and rotatable about a rotational axis different from a rotational axis of said rotational member;

a clutch side transmission gear operatively meshed with said input side rotational member of said clutch and rotatable about a rotational axis different from a rotational axis of said input side rotational member; and a rotation coupling shaft for coupling said planetary side transmission gear and said clutch side transmission gear with each other.

5. The speed-change transmission apparatus according to claim 3, further comprising:

a pair of planetary side transmission gears operatively meshed respectively with two rotational members of said planetary transmission section and rotatable about rotational axes different from rotational axes of said two rotational members;

a pair of clutch side transmission gears operatively meshed respectively with input side rotational members of two clutches of said clutch section and rotatable about rotational axes different from rotational axes of said two input side rotational members;

a pair of rotation coupling shafts for operatively coupling said pair of planetary side transmission gears with said pair of clutch side transmission gears, respectively; and one of said pair of rotation coupling shafts being constructed as a hollow shaft and rotatably receiving the other of pair of rotation coupling shafts.

6. The speed-change transmission apparatus according to claim 2, further comprising:

a planetary side transmission gear operatively meshed with a rotational member of said planetary transmission section and rotatable about a rotational axis different from a rotational axis of said rotational member;

a clutch side transmission gear operatively meshed with said input side rotational member of said clutch and rotatable about a rotational axis different from a rotational axis of said input side rotational member; and a rotation coupling shaft for coupling said planetary side transmission gear and said clutch side transmission gear with each other.

7. The speed-change transmission apparatus according to claim 3, further comprising:

a planetary side transmission gear operatively meshed with a rotational member of said planetary transmission section and rotatable about a rotational axis different from a rotational axis of said rotational member;

a clutch side transmission gear operatively meshed with said input side rotational member of said clutch and rotatable about a rotational axis different from a rotational axis of said input side rotational member; and a rotation coupling shaft for coupling said planetary side transmission gear and said clutch side transmission gear with each other.

* * * * *

UNITED STATES PATENT AND TRADEMARK OFFICE
CERTIFICATE OF CORRECTION

| | | |
|---|---|---|
| PATENT NO. | : 7,887,449 B2 | Page 1 of 1 |
| APPLICATION NO. | : 11/661846 | |
| DATED | : February 15, 2011 | |
| INVENTOR(S) | : Katayama et al. | |

It is certified that error appears in the above-identified patent and that said Letters Patent is hereby corrected as shown below:

Column 27, line 38, Claim 1, "with a planetary" should read -- with a planetary gear --

Signed and Sealed this
Tenth Day of May, 2011

David J. Kappos
*Director of the United States Patent and Trademark Office*